Figure 1:
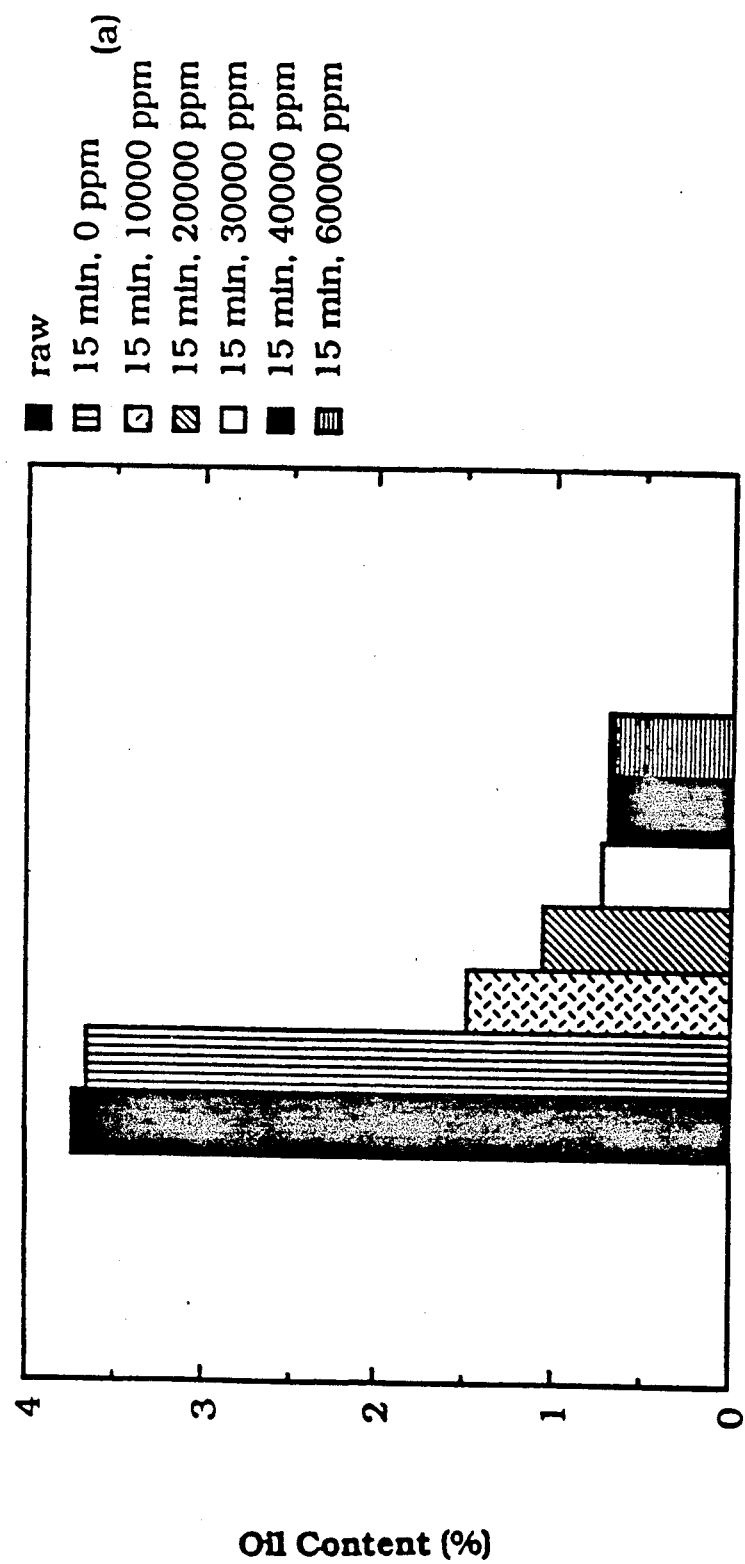

United States Patent [19]

Blake et al.

[11] Patent Number: 5,047,083

[45] Date of Patent: Sep. 10, 1991

[54] PROCESS FOR DE-OILING MILL SCALE

[75] Inventors: Natalie R. Blake, Lisle; Kristine S. Siefert, Crete, both of Ill.

[73] Assignee: Nalco Chemical Company, Naperville, Ill.

[21] Appl. No.: 366,703

[22] Filed: Jun. 15, 1989

[51] Int. Cl.$^5$ .............................................. C22B 7/00
[52] U.S. Cl. ........................................ 75/711; 75/962; 134/2; 134/40
[58] Field of Search .................... 75/28, 29, 962, 711; 134/2, 40

[56] References Cited

U.S. PATENT DOCUMENTS

| | | | |
|---|---|---|---|
| 3,844,943 | 10/1974 | Duval | 210/67 |
| 4,091,826 | 5/1978 | Bahrke | 134/40 |
| 4,177,062 | 12/1979 | Pack | 75/472 |
| 4,288,329 | 9/1981 | Duval | 210/772 |
| 4,326,883 | 4/1982 | Schwarz | 75/5 |
| 4,585,475 | 4/1986 | Fosnacht | 75/51.2 |
| 4,738,785 | 4/1988 | Langston et al. | 210/738 |
| 4,988,391 | 1/1991 | von Bormann | 134/40 |

FOREIGN PATENT DOCUMENTS

| | | |
|---|---|---|
| 3043220 | 6/1982 | Fed. Rep. of Germany . |
| 3120463 | 10/1982 | Fed. Rep. of Germany . |
| 3146809 | 11/1982 | Fed. Rep. of Germany . |
| 84/00183 | 3/1985 | PCT Int'l Appl. . |
| 828475 | 11/1982 | South Africa . |

OTHER PUBLICATIONS

"Handling of Mill Scale Sludges", *Ertzmetal*, vol. 37, No. 6, Jun. '84, pp. 302–305.
"Removal of Organics", *Conservation & Recycling*, vol. 8, No. 3–4, by De Filippi, pp. 377–381, 1985.
"Steel Mill Residue Recycling Processes", by Margolin, *Conservation & Recycling*, vol. 8, No. 3–4, pp. 359–362, 1985.
"Treatment of Oily Waste from a Steel Mill", by Woods, *Journal of Water Pollution Control Federation*, vol. 45, No. 10, Oct. '73.
"Dewatering of Steel Mill Sludges by Belt Press Filtration", by Patzelt, *Proceedings of the 39th Industrial Waste Conference*, May 8–10, 1984, pp. 469–485.
"Recycling of Ferrous Steel Plant Fines", State of the Art *Iron & Steelmaker*, vol. 8, #4, 1981, pp. 22–26.
"Steel Industry Sludge is Being Reused", Patent Report, Env. Sci. & Technol. 9(7) 624 (1975).
"Republic Steel Recycling Over 80% of Wastewater from Steel Mill", Civil Engineering (NY), 6/6/80, pp. 102–103.

*Primary Examiner*—Melvyn J. Andrews
*Attorney, Agent, or Firm*—Donald G. Epple

[57] ABSTRACT

A process for de-oiling mill scale which comprises
(a) collecting mill scale and analyzing for oil content; and then
(b) slurrying the portion of mill scale containing more than 0.5 weight percent oil in water to achieve an aqueous mill scale slurry having at least 25 weight percent solids content; and then
(c) high shear agitating the aqueous mill scale slurry to form a reduced oil mill scale suspension in an oily water emulsion; and then
(d) phase separating the reduced oil mill scale from the oily water emulsion forming a reduced oil mill scale and an oily water emulsion; and then
(e) fresh water rinsing the reduced oil mill scale to form an oil-free mill scale and a waste wash water; and then
(f) recycling the waste wash water to form at least a portion of the aqueous mill scale slurry of step b; and then
(g) repeating steps (a) through (f) until the oil-free mill scale contains less than 0.5 weight percent oil; and then
(h) drying the oil-free mill scale for use to form sinter plant feed in the steel making process.

16 Claims, 21 Drawing Sheets

Figure 17:
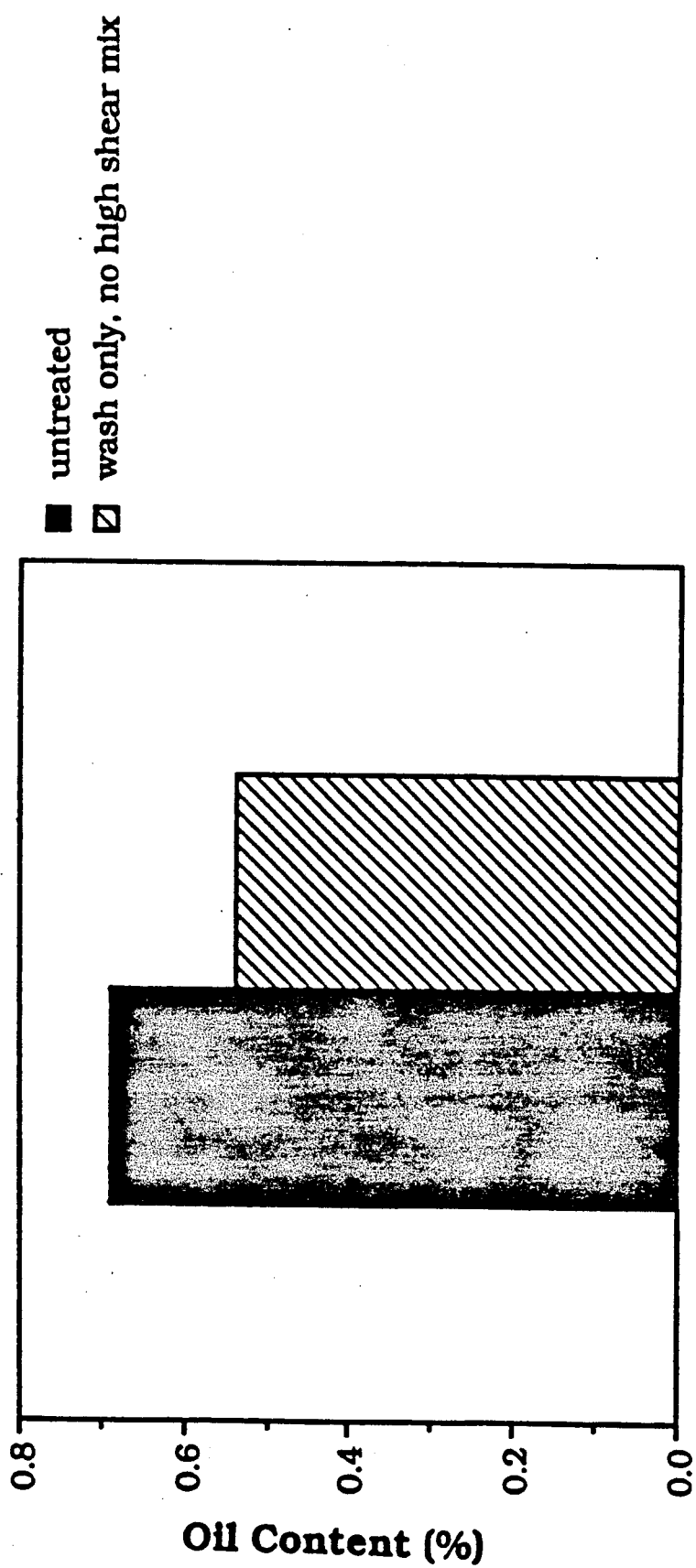

Fig. 17 Effect of Rinsing Scale Without Prior Treatment.

PROCESS FOR DE-OILING MILL SCALE

INTRODUCTION

Mill scale is a waste iron oxide by-product formed during the steelmaking process and particularly during the processes in the steel plant which occur after the blast furnace which processes permit steel ingots to be formed into various sheet, tube and other products.

Each of the operations which are used to form the final steel products normally involve lubricants both in the process of manufacturing the final product as well as lubricants used in the equipment exposed to hot steel during the formation of the final steel products. As a result, oil contamination of mill scale, which is an iron oxide by-product which is formed during the steelmaking process and during the processes that finally make steel products, occurs.

This oil contamination of the mill scale limits its recycle back into the steelmaking process because the heat involved liberates hydrocarbons and various oxides of hydrocarbons which contaminate the air and do not permit the steel operator to meet environmental quality demands. In addition, if the mill scale is recycled to the sinter plant which prepares the feed to blast furnaces, the oil which contaminates the mill scale results in operational problems by fouling fan blades and filter bags in the bag house as well as producing the excessive hydrocarbon emissions mentioned above.

The steel industry as a whole is faced with increasing amounts of mill scale which cannot be used because of oil contamination which results both in higher raw materials costs and higher disposal costs. Mill scale can account for up to about 6 weight percent of the total iron used in the process of making steel.

It is quite surprising in fact to realize that a typical steel mill produces from about 100 to as much as 750 tons per day of oily mill scale, all of which is contaminated with hydrocarbon oils to some degree or another.

When the oil contamination on a mill scale reaches a level of from 0.5% to 5% and above, this mill scale is unusable for recycle into the sinter plant because of the problems caused by excessive hydrocarbon emissions, fouling of fan blades, blinding of filter bags, and the like.

Various approaches have been used in the past to attempt to remove this oil from mill scale which approaches have included solvent extraction using a hydrocarbon solvent or a non-aqueous solvent in which the hydrocarbon oils were soluble, kiln processes which vaporized and oxidized the oil thereby reducing their content on the mill scale, and water extractons of the mill scale in the presence of large concentrations of surfactants and detergents which were used for the purpose of removing oil from the mill scale.

For various reasons, none of these approaches have been successful in commercial operation. Solvent extractions are expensive and create other hazards such as explosion hazards as well as air pollution hazards and the like. Heated kiln processes which vaporize and/or oxidize oily contaminants still do not achieve acceptable hydrocarbon emissions levels, and the processes operated in the past do not achieve permitted air quality levels. The use of detergents at high concentrations create foaming problems and have not routinely been operable at economic levels.

It is therefore an object of this invention to provide a process which will remove sufficient oil from mill scale to allow the recycle of this iron-bearing mill scale material back into the steelmaking process without threat to the environment through high hydrocarbon emissions or through any other means.

It is also a goal of this invention to achieve a de-oiling process for mill scale which will remove and recover oils from mill scale as well as provide a low hydrocarbon bearing mill scale iron oxide material for recycle directly into the blast furnace or through the sinter plant which manufactures blast furnace feeds.

It is a goal of this invention to develop a process to de-oil mill scale, allow its recycle back into the steelmaking process, and achieve this in a shorter time scale than can be achieved with the practice of other technologies. This also shall be done without providing major impact on air quality.

It is a further object of this invention to accomplish the de-oiling of mill scale with a high energy slurry technique whereby highly concentrated iron oxide slurries are formed by suspending contaminated mill scale in water, and then providing sufficient energy to remove contaminating oils from the surface of iron oxide particles making up this mill scale and either suspending, dissolving, or emulsifying this oil in the water used to form the slurry.

It is a further object to then phase separate the suspended iron oxide and other solid material making up the contaminated mill scale from the oil contaminated waters formed by this high energy mixing so as to provide an oil free mill scale and a contaminated oily emulsion which then is treated separately to recover oil and treated fresh waters.

It is a further object of this invention to accomplish the formation of this oily emulsion suspension of de-oiled mill scale either in the presence or the absence of other chemical treating agents which may be used simultaneously with the high energy slurry treatment.

By practicing the technology of the inventions to be described below, it is possible to remove at least 90% of the oil originally contaminating an oily mill scale and may also be possible to remove up to and perhaps more than 95% of this contaminating oil from the original contaminated mill scale.

PRIOR PRACTICES OF DE-OILING MILL SCALE

Mill scale de-oiling has been achieved by techniques referred to as critical fluid extraction which techniques have been described by Cody, et al at a "Symposium on Iron and Steel Pollution Abatement Technology for 1982", which symposium was held in Pittsburgh, Pa. from Nov. 16-18, 1982.

Further, investigations were carried out in the United States, Japan, and West Germany on techniques for recycle of oily mill scale sludges in steel mills, which techniques were presented in an article entitled "Handling of Mill Scale Sludges" which appeared in "Ertzmetal", Volume 37, No. 6, published in June, 1984 on pages 302-305. The abstract of the article does not mention particular techniques other than the physical handling of oily mill scale sludges.

An article entitled "Untersuchunger Zur Entoelung Von Walzzunder" by Supp, et al, published in Technische Mittellunger Krupp, Forschungsberichte, Volume 33, No. 3, published December, 1975, pages 89-92 announced the washing of gravel filters in a water recirculating system used on Krupp's wide strip hot rolling mills producing a sludge containing heavily oiled fine mill scale and teaches a method of treating this sludge and water suspension by dewatering the sludge in a circular thickener and de-oiling the effluent by agitating with high concentrations of an alkaline cleaning agent at high temperatures, then passing the cleaning agent suspension of mill scale through a centrifugal separator to remove solids.

An article entitled "Characterization and Utilization of Iron Bearing Steel Plant Waste Materials" by Fosnaught presented at a conference entitled "Physical Chemistry of Extractive Metallurgy" (proceedings of an International symposium held at the AIME annual meeting in New York, N.Y., U.S.A., Feb. 24-28, 1988) described an investigation to obtain the scope of problems associated with recycling various waste metal oxide materials generated at Inland Steel. The techniques summarized in this report include the cold bonding agglomeration method for producing waste oxide agglomerates without de-oiling, and the use of various techniques for beneficiating blast furnace flue dust and soaking pit rubble to upgrade these materials to be utilized in the sinter plant or ironmaking operations. No attempt to de-oil these mill scales was mentioned.

An article entitled "Removal of Organics From Recycled Materials" by De Filippi, published in "Conservation and Recycling", Volume 8, Nos. 3-4, 1985 taught solvent extraction technology to recover waste oils contaminating mill scale and machining scraps. Solvent extraction technologies taught used common organic solvents to remove mill scale contamination to achieve de-oiled materials with oil levels below 0.1% by weight.

In an article entitled "Steel Mill Residue Recycling Processes" by Margolin, published in "Conservation and Recycling", Volume 8, Nos. 3-4, 1985, several conventional and non-conventional recycling processes were summarized, none of which are the processes of the instant invention.

In an article entitled "Republic Steel Recycling Over 85% of Waste Water From Steel Mill" appearing in "Civil Engineering" (New York), Volume 50, No. 6, June, 1980, pages 102-103, the anonymous author describes a recycled operation for suspended particles of scales and oils and greases obtained in the Republic Steel Mill operating in Canton, Ohio. This scale is removed by adding chemicals that clump together small particles of scale to form larger particles which settle out of waste water by gravity and provide for the possibility of oil being skimmed off the top of the clarifier.

In an article entitled "Recycling of Steel Plant Waste Materials" by Ralph, appearing in "Steel Times" Volume 204, No. 8, August, 1976, pages 718-724, the author describes the considerable tonnages of ironbearing waste materials generated in modern iron and steelmaking processes, but primarily emphasizes control of fumes and dusts from furnace gas cleaning plants and scales and sludges from steel casting and hot rolling operations as being the source of these waste iron oxide bearing materials. The author suggests installation of more efficient fume removal equipment.

In an article entitled "Treatment of Oily Waste From a Steel Mill" by Woods, et al, published in the "Journal of Water Pollution Control Federation", Volume 45, No. 10, October, 1973, the theory of oily waste water stability was reviewed. Laboratory scale processes to describe treatment of these oily wastes are presented. Although the authors mentioned relatively high revolution per minute mixing, this mixing was to accomplish an oil water phase separation and was not related to mill scale treatments.

In an article entitled "Dewatering of Steel Mill Sludges by Belt Press Filtration" by Patzelt, et al, presented at the "Proceedings of the 39th Industrial Waste Conference" in West Lafayette, Ind., U.S.A., May 8-10, 1984, the author describes the treatment of various steel mill sludges including sludges formed by suspension of oily mill scale in belt press filtrations.

In an article entitled "Recycling of Ferrous Steel Plant Fines, State-of-the-Art", by Fosnaught, presented in "Iron and Steel Maker", Volume 8, No. 4, April, 1981, pages 22-26, the author presents a summary of the treatment of various flue dusts, sludges and mill scale, said treatment primarily involving sintering, green balling, and high temperature kiln processing techniques.

An invention by Von Bormann, which appears in European Appln. 157805, filed Oct., 16, 1985, describes oil contaminated mill scales being processed in a washing drum with countercurrent contact with a wash liquor at pH 12-14 where the wash liquor contains various detergents. The process includes the solids being lifted by blades on the washing drum, a dewatering unit and a device for displacing the wash liquor with water.

In addition to the above, various patents have been applied for or issued which have as their goals the treatment and recovery of mill scale for recycle into the steel mill. These patents and other references are listed below and all are incorporated herein by reference:

ARTICLES

1. Steel Industry Sludge is Being Reused, Pat. Report (Practical Available Technology), Env. Sci. & Technol. 9(7), 624 (1975).
2. Recycling of Ferrous Steel Plant Fines, State-Of-The-Art, Iron and Steelmaker Vol 8 #4, 1981, pps. 22-26.
3. Characteristics and Utilization of Iron-Bearing Steel Plant Waste Materials, Donald R. Fosnacht, Inland Steel Co. Research Laboratory, East Chicago, Ind. 46312.
4. Republic Steel Recycling Over 85% Of Wastewater From Steel Mill, Civil Engineering (New York) v. 50 no. June 6, 1980, pps. 102-103.
5. Recycling of Steel Plant Waste Materials, Steel Times, v. 204, no. 8, August 1975, pps. 718-724.
6. Pollution Control and Upgrading of Mineral Fines with Bitumen Author: Herment, R; Bazin, P.; Corkill, J. E. M. Miner. Environ., Proc. Int. Symp., Meeting Date 1974, 245-59. Edited by: Jones, Michael J. Inst. Min. Metall.: London, Engl.
7. Manufacture of Sponge Iron; Author: Omura, Takeo; Okabe, Ritsuo; Maeda, Yoshiaki; Makino, Kiyoshi Jpn. Kokai Tokkyo Koho JP 61/183402 (86/183402), Aug. 16, 1985, 5 pp.
8. Removing Oils and Fats from Bulk Materials; Author: Heusch, Rudolph; Werner, Udo; Langer; Ger. Offen. DE 3232915 A1, Mar. 8, 1984, 12 pp.
9. Moisture Adjustment for Sintering Feed; Jpn. Kokai Tokkyo Koho JP 58/147524 A2 (83/147524), Sept. 2, 1983, 3 pp.
10. Recycling Oily Mill Scale; Author:Fosnacht, Donald R. Can. CA 1154595 A1, Oct. 4, 19893 24 pp.
11. Use of Metal-Oil Scale in the Production of Keramzit Author:Knigina, G. I.; Panova, V. F.; Kravtsov, P. A. Prom-st. Stroit. Mater., Ser. 11 (Nauchno-Tekh. Ref. Sb., (7), 6-8.

12. Development of a Deoiling Process for Recycling Millscale Author:Harold, Derek S. Recycling Steel Ind., Proc. Process Technol. Conf., 1st, 184–7. Iron Steel Soc. AIME: Warrendale, Pa.
13. How to Simplify Lube Oil System Cleanup Author: Martin, L. D.; Young, J. O.; Banks, W. P. Hydrocarbon Process, 56(1), 88–90.
14. Experience in the Use of Mill Scale in the Production of Acid Pellets Author:Fitzpatrick, James M.; Roberts, Terence J.; Thomson, Ian A. Pap. Symp. Pellets Granules, 181–9. Australas. Inst. Min. Metalll: Parkville, Aust.
15. Agglomeration as an Aid in Treating Waste Materials Author:Dean, Karl C.; Haven, Richard; Valdez, Espiridion G.; Proc. Bienn. Conf. Inst. Briquet. Agglom., 13, 23–66.

U.S. PATENTS

1. U.S. Pat. No. 3,844,943, Title: METHOD AND APPARATUS FOR PROCESSING WASTE WATER SLIMES OF STEEL MILL WATER TREATMENT SYSTEMS, Inventor: Leonard A. Duval, Filed: June 18, 1973.
2. U.S. Pat. No. 4,326,883, Title: PROCESS FOR DE-OILING AND AGGLOMERATING OIL-BEARING MILL SCALE, Inventor: Arthur M. Schwarz, Filed: July 10, 1979.
3. U.S. Pat. No. 4,585,475, Title: METHOD FOR RECYCLING OILY MILL SCALE, Inventor: Donald R. Fosnacht, Filed: Oct. 23, 1981.
4. U.S. Pat. No. 4,738,785, Title: WASTE TREATMENT PROCESS FOR PRINTING OPERATIONS EMPLOYING WATER DISPERSIBLE INKS, Inventor: Jesse R. Langston, Frank J. Tortorici, and Fred D. Barlow, Jr., Filed: Feb. 13, 1987.
5. U.S. Pat. No. 4,288,329, Title: DE-OILING AND AGGLOMERATING OIL-BEARING MILL SCALE, Inventor: Schwarz, Arthur M., Filed: Apr. 27, 1982.

FOREIGN PATENTS

1. Offenlegungsschrift DE 3043220 A1.
2. Patentschrift DE 3120463 C1.
3. Patentschrift DE 3146809 C1.
4. Patentschrift DE 3223011, Assignee Thyssen Ind. AG, Inventor: Weber G; Gover B.
5. PCT/DE 84/00183, "Process, Plant and/or Device For Preparing Oil-Coated Scales or Similar Materials", Inventor: Gerhard F. Hiebsch, Mar. 14, 1985.
6. Patent Appln. Republic of South Africa, No. 828475, "Method and Apparatus For Roll or Mill Scale and For Extracting Crude Oil From Oil-Containing Minerals", Applicant: AM Thyssenhaus 1, 4300 Essen, Germany.
7. Eur. Pat. Appl. EP 80589 A1, June 8, 1983 "Method and Equipment for Cleaning Roll Scales Contaminated with Greasy Substances, Especially Oil, and for the Production of Petroleum from Oil-Containing Minerals" Inventor: Weber, Guenter; Grover, Brijmohan.
8. Jpn. Kokai Tokkyo Koho JP 56/79180 (81/79180), June 29, 1981 "Coal Liquefaction", Assignee Sumitomo Metal Industries, Ltd.
9. Ger. Offen. De 2920379, Dec. 6, 1979, "Removal of Oil and Recovery of Metal from Rolling Mill Scale" Inventor: Pack, Paul Richard.
10. Japan. Kokai JP 52/93603 (77/936031), Aug. 6, 1977, "Recycling of Fine Mill Scale and Oil Mixtures"; Inventor: Noda, Jutaro; Obara, Yoshiji; Sasaki, Shinichi.
11. Japan. Kokai JP 52/73181 (77/73181), June 18, 1977 "Separation from Oil-Containing Gases; Inventor: Matsumura, Toru; Fujita, Michitaka; Nishimura, Shoji.
12. Japan. Kokai JP 52/111492 (77/111492), Sept. 19, 1777 "Use of Sludge Containing Iron Oxide"; Inventor: Maruo, Shoichi.
13. Japan. JP 51/33486 (76/33486), Sept. 20, 1976 "Treatment for Oil and Scale Mixture" Inventor: Arai, Tamao; Shimizu, Masaharu; Mitani, Kotaro; Tanikawa, Kazuaki; Matsuo, Yasutoshi.

Of particular note in the above list of patents, the patent to Gartner, et al, West German 3,146,809, describes a method of de-oiling mill scale by washing the scale in a slurry in a wash medium classifying it in terms of size to recover oil free coarse particles and a slurry of fine particled mill scale which is then subjected to hydrocyclone washing to recover oil-free medium size particles, then clarifying the remaining slurry to separate out fine particles of mill scale. In the process the slurry is subjected to at least one flotation stage to give an oil concentrate from which the oil is then separated. Preferably in the process taught by Gartner, the slurry is subjected to a magnetic separation prior to oil flotation. Other of Gartner's patents include West German patent 3,120,463, West German Patent 3,120,463, West German Patent 3,043,220, all of which are incorporated herein by reference.

Most of the Gartner references cited above, and incorporated herein, involve hydrocyclone washing after particle sizing, then slurrying of mill scale fines, and a magnetic separation to achieve an oil free medium size grain agglomerate of mill scales.

Other techniques have included burning off the contaminated oil by contacting the contaminated mill scale with the liquid slag from steel refining stages at temperatures above the ignition temperature of the oil. Again these techniques provide for high environmental pollution.

TERMS AND TERMINOLOGY

The term "mill scale" as used herein refers to various iron oxides residues obtained from various operations within a steel mill including but not limited to those iron oxides formed in the steel making process on the surface of various manufactured steel parts such as steel slabs or steel blooms, the operation of rolling steel to form a steel plate or sheet, in operations for forming steel rods, steel pipe or steel wire in various shapes and sizes, including the formation of steel I beams, L beams, E beams and the like, and iron oxide scales, rusts, surface corrosion products, formed in the general manufacture of steel and steel products within a steel mill.

The term "slurrying" means a process of dispersing various particulate forms of mill scale in water to achieve slurries containing at least 25 weight percent solids content. These slurries can contain as high as 80 weight percent solids content.

The term "high shear agitation" means that agitation which can be achieved by exposing the slurries defined above to high shear mixing conditions, preferably in a continuous operation so as to achieve a propeller tip speed of at least 1350 feet per minute, preferably at least 1500 feet per minute and most preferably at least 1750 feet per minute, depending on equipment size. The high shear agitation of this invention preferably is accomplished where dual propellers are reverse pitched in a cell, or vessel, and providing interparticle contact in the slurries defined above.

The term "aqueous mill scale slurry" means a slurry having at least 25 weight percent solids content of untreated mill scale as collected from a steel plant operation.

A "reduced oil mill scale suspension" in oily water emulsion means that suspension which is formed by the high shear agitation of mill scale from a steel mill slurried in water at a weight percent solids of at least 25 weight percent and exposed to high shear agitation as defined above for a time period ranging between 5–120 minutes at a temperature ranging from 1°–99° C. and a slurry concentration ranging from 20–80 weight percent.

The term "an oily water emulsion" means that portion of the slurry which is liquid and contains both water and those portions of oily wastes from the mill scale which are suspended, emulsified, or dissolved in the water.

The term "fresh water" means water coming from any water supply which has not been contaminated with oils obtained from mill scale. This water can be potable water, city water, treated effluent water, or process water which has not been in contact with mill scale or the oil products derived and recovered from mill scales. Fresh water may also include oily emulsified waters which have been treated to remove therefrom oil contaminants to provide for the recovery of oil wastes and generation of fresh water.

The term "oil-free mill scale" means a treated mill scale containing from about 0.2 to about 0.5 weight percent oil, but preferably below 0.2 weight percent oil.

The term "a major portion" means 30 weight percent of the material referred to.

A "partially de-oiled mill scale" is that mill scale which has been treated with a simple water wash under either normal agitation conditions or high energy, high shear agitation.

An "oily aqueous phase" is that aqueous phase obtained by prewashing the mill scale slurries prior to exposure to high energy high, shear agitation.

The term "rinse" means a post treatment, fresh water wash of de-oiled or partically de-oiled mill scale with fresh water, particularly after high energy, high shear agitation of oily mill scale suspended in water.

Other terms used herein are believed to be recognizable by a person familiar with the art. The term drying simply means removal of water by exposure to air, by exposure to heated air or by drying in a kiln, vacuum drying or other similar device. Drying can also include just simply storing in a storage container or on the ground exposed to the atmosphere whereby liquids such as water contained on the oil-free mill scale can evaporate into the atmosphere.

THE INVENTION

We have invented a process for de-oiling mill scale which comprises:

(a) collecting mill scale and analyzing same for oil content; and then (b) slurrying that portion of mill scale containing more than 0.50 weight percent oil in a water slurry to achieve an aqueous mill scale slurry having at least 25 weight percent solids content; and then (c) exposing said aqueous mill scale slurry to high energy, high shear agitation to form a reduced oil mill scale suspension in an oily water emulsion; and then (d) phase separating the reduced oil mill scale from the oily water emulsion, thereby forming a reduced oil mill scale and a oily water emulsion; and then (e) fresh water rinsing the reduced oil mill scale to form an oil-free mill scale and a waste wash water; and then (f) recycling the waste wash water to form at least a portion of the aqueous mill scale slurry of Step b; and then (g) repeating steps (a) through (f) using at least a portion of the oil-free mill scale of step (e) until the oil-free mill scale contains less than 0.50 weight percent oil, and then (h) drying the oil-free mill scale for use to form sinter plant feed for use in the steel making process.

In our process, it is also preferred to incorporate into the aqueous mill scale slurries at least 100 ppm preferably 500 ppm–75,000 ppm, and most preferably from 2,000–60,000 ppm, based on the total weight of mill scale, of a water dispersible surface active agent capable of dispersing or dissolving in water at least a major portion of the oily components found on or in mill scales, and which surface active agent is essentially not retained on the oil-free mill scale after water washing.

It is preferable to operate the high shear mixing with a mechanical shearing device providing sufficient energy to assist in removing oil contamination from the surfaces of the mill scale particles. This is best achieved when the mill scale slurries in water contain from 25–80 weight percent solids, preferably, from 35–75 weight percent solids, and most preferably between about 40–70 weight percent solids. It is particularly preferable to operate with mill scale slurries in the 50–65 weight percent range.

When dealing with slurries of the type mentioned above, it is necessary to have high shear, high energy mixing devices. In the use of the term, high shear or high energy mixing, we mean to indicate that, in a continuous process, the impellers on the shaft of the mixer are operating at tip speeds ranging from about 1350 to about 5500 feet per minute, again, depending on equipment size. Energy input in our preferred continuous high energy, high shear mixing devices range from about 450 to 3000 joules per pound of mill scale slurry.

In a batch operation, typical energy input would range from about 3.0 to about 10.0 horsepower per cubic foot of mill scale slurry, depending on equipment size.

In large scale equipment, it is preferable to use a device referred to as the Denver Attrition machine, a device originally designed for scrubbing sand at densities of 70–80 percent solids. Other operations for which this Denver Attrition machine has been used include the removal of iron stains from glass sands, the disintegration of clay balls and bituminous matter, the liberation of important mineral values that may occur as slime coatings on sand grains, the separation of sand grains from cementing materials, and other high energy density intense conditioning of other compounding formulations.

The Denver Attrition machine, or the Attritor as used herein, consists generally of support structures, drive mechanisms, propeller shafts, dual propellers, tanks and cell partitions and may be operated in multiple series operations, either continuously or batchwise, wherein the motors, shafts and propellers, either low pitch and/or high pitch, operate in a cell which cells may be connected by series one with the other until a series of 6-8 consecutive cells, or more, has been achieved.

The Denver Attrition machines provide for an extremely intense scrubbing zone in each cell between two large oppositely pitched propellers. Particles are forced to impinge on each other and thereby clean themselves. In the operation of this invention, the particles are exposed to such shearing forces that the oil contained on the surfaces of the particles are partially or completely removed from those surfaces and are either suspended, emulsified, dispersed, or dissolved in the water which makes up the original oily mill scale slurries.

In practice, each cell of the Attrition device is designed so that a difference in the degree of pitch between propellers gives direction to the movement of the slurries being treated, advancing the slurry mass from cell to cell through the Attrition machine until the high energy super-intense scrubbing operations are complete. In connecting cells of the Denver Attrition machine, flow is alternatively down and up in adjacent cells eliminating short circuiting and assuring full contact time of the slurry in the highly energy intense scrubbing zones with high shear motions.

The high efficiency of this intense high energy mixing as provided by the Denver Attrition machine is caused by both the very high density of the slurries formed from the mill scale and the ability of the reversed pitch, axial flow propellers, operated at high top speed and energies, designed into the Denver Attrition machine to efficiently circulate this high density material. The device is claimed to provide maximum particle contact per unit of horsepower input. The device easily treats the mill scale slurries mentioned above, particularly in the range of from 40-75 weight percent solids.

The Denver Attrition machines are manufactured by the Denver Equipment Company located in Colorado Springs, Colo. Other devices providing for similar energy of mixing can also be used in our invention, such as devices manufactured by Eagle Ironworks, DesMoines, Iowa; DeDietrich, Union, N.J., and others.

The temperature of operation which can be achieved using the high energy oil extraction techniques cited above include operations from 1°-99° C., preferably from 10°-80° C., and most preferably between about 20°-75° C.

Contact times for the mill scale slurry in the high energy intensity, high shear Denver Attrition machine, or its equivalent, range from about 5 to about 120 minutes. As will be demonstrated, efficiency of oil removal from the contaminated oil mill scale increases as the total energy, expressed as a function of shear and mixing time, increases. Therefore, at a given temperature, increased shear increases the removal of oil from contaminated mill scale at the same mixing time. Likewise at a given temperature, increased mixing time at a constant shear increases the removal of oil from contaminated oily mill scale.

In general, increased shearing energies and increased contact times all provide for the increase of oil removed from oily contaminated mill scale. However, at maximum mixing times and shear, the formation of mill scale fines also increases. This result is not desirable since it can cause problems later in recovering treated mill scale from oily waste waters. As a result it is preferred that the continuous operations of our invention operate at temperatures ranging between about 20°-75° C., contact times ranging between about 10 minutes to about 90 minutes, and energy input ranging between about 450 to about 3000 joules per pound of mill scale slurry.

The difficulty in removing oil from mill scale is compounded by the fact that this oily mill scale contains a number of different kinds of oily materials which can contribute to contamination of the mill scale. Analysis of these materials has demonstrated the presence of hydrocarbonaceous oils, oxidized and partially oxidized lubricants, hydraulic fluids, greases, gear oils, turbine oils, circulating oils, rolling oils, animal fats and synthetic fats, transmission and crank case oils, cutting oils, glycols and glycol esters and ethers, organic acids, organic esters, silicone oils and the like.

Some of these "oily contaminants" are easily removed by water washing the contaminated mill scale. Therefore the processes of our invention can include, optionally, prior to the high shear agitation of the aqueous mill scale slurries, a water washing including the low energy slurrying of the oily mill scale in water, followed by a phase separation into a partially de-oiled mill scale and an oily aqueous phase, the oily aqueous phase then being at least partially removed to form the aqueous mill scale slurry originally generated when oil mill scale is slurried in water. The partially de-oiled mill scale is then reslurried in fresh water prior to its treatment in the high energy high shear agitation phase and subsequent steps of our process. The term low energy slurrying simply means the use of sufficient energy to maintain the slurries of this invention in suspension. Our slurries are those which, in the absence of any agitation or mixing, easily and readily settle to form a liquid phase containing a settled solid phase made up of particulate mill scales of varying sizes.

Also, because mill scale is found in various sizes, it is optionally preferred to size the mill scale either prior to formation of the original mill scale aqueous slurries or after the initial formation of the aqueous mill scale slurry. It has been found that extremely large mill scale particles have in general less oil and may in fact contain a relatively small amount of oil contamination that permits immediate recycled entry into the sinter plant for use in the steel making process. Depending on the degree of oil contamination, mill scale which does not pass through a No. 5 or No. 6 sieve, which seive would retain a particle size above about 0.157-0.132 inches (diameter), can provide a screened mill scale with contaminations below 0.4-0.5 weight percent oil and sometimes much lower. As a result, this material is easily recycled immediately to the sinter plant. In fact, if oil contamination of a particular mill scale is below about 1.0 percent, a portion of this mill scale may be screened with a 16 mesh sieve and still be used directly in the sinter plant.

Therefore, our processes may include an optional, but preferable, sizing operation for the mill scale where the mill scale is sized prior to, or after, the slurrying in water to form the aqueous mill scale slurry. However, the sizing operation may also occur immediately after forming the aqueous mill scale slurry to remove particles which will not pass a No. 5 or No. 6 sieve, and reslurrying those particles which do pass a No. 5 or No. 6 sieve to form the mill scale slurry having particles that pass through the equivalent of the No. 5 or No. 6 sieve size mesh screen.

By operating our process as presented, we can easily achieve de-oiling of from 0.5 tons per day up to and including 2000 tons per day of mill scale. Preferably, our process operation is capable of de-oiling from 10 tons per day to 1500 tons per day of mill scale, and most preferably our operation is capable of achieving de-oiling of from 100 to 1400 tons per day of contaminated oily mill scale.

The operation of our process can achieve from 15–70 percent removal of all forms of oily wastes contaminating a mill scale, preferably removes from 20–80 percent of all forms of oily waste contaminating mill scale, and most preferably can achieve from 30–85 percent removal of all forms of oily contamination in a mill scale without the presence of any surfactants, detergents, polymers and the like. Most preferred operations, without surfactants, detergents, or other chemical additives, have included up to 88% removal of all forms of oil contaminating the mill scale.

If water rinses are used prior to and immediately following the high energy slurry mixing of oil contaminated mill scale, our operations achieve at least 85% removal of all forms of oily contamination on a mill scale and have achieved at least 90 percent removal of all forms of oil contamination on a mill scale.

However, by using certain treatment chemicals at relatively low concentrations, it is possible to increase routine operations to achieve oil removal within about 90–98% removal of all contaminating oils on a mill scale and routinely can achieve from 92–96% removal with chemical treatment included in all or varying operations of the process as described above.

CHEMICAL SURFACE-ACTIVE AGENTS SURFACTANTS AND EMULSIFIERS

As an example of the chemical treating agents which may be used, a six mole percent ethylene oxide adduct of nonyl phenol, used at concentrations ranging from about 100 ppm to about 60,000 ppm, based on the total weight of the mill scale can increase the efficiency of removal of oily wastes of all forms from mill scale using our process so as to achieve generally from 90–98 weight percent removal efficiencies of all forms of contaminating oils contained originally in the oily mill scale. In addition to the nonionic type of surfactant, both anionic and cationic surfactants have also been used to achieve the increased yields of recovered oils and the decreased amount of oil found in the treated de-oiled mill scale.

However, certain surfactants, to our surprise, have not achieved decreases in the contaminating oil at the end of the process, relative to operations in the absence of surfactants. Therefore our invention would include only the use of those surfactants which are capable of achieving a decreased oil content in de-oiled mill scale, as compared to operation of our process without those surfactants being present.

When nonionic surfactants or emulsifiers are used, these surfactants preferably have an HLB ranging between about 6 to about 20 and most preferably have an HLB ranging between about 8.5 to about 15. HLB stands for Hydrophilic-Lipophilic Balance, as defined in McCutcheon's Publication, "Emulsifiers and Detergents", 1984 Annuals, published by McCutcheon's Division MC Publishing Company, Glen Rock, N.J., which is incorporated herein by reference.

However, anionic surfactants or surface active agents, such as the free acids of complex organic phosphate esters and certain nonionic surfactants, such as a dialkyl phenoxy polyethylene oxy ethanol, when used in our process, actually gave treated mill scales that contain higher oil content than the materials treated by the process in the absence of any treating chemical. This can be determined by a pre-screen test procedure at laboratory scale. These surfactants/emulsifiers should be avoided.

PHASE SEPARATION

By the term phase separation or phase separating, we mean to indicate that solid phases are separated from liquid phases by any number of techniques known in the art. Such phase separations may be accomplished simply by settling in a settling tank which permits recovery of solids in a collection of bottoms slurries and the recovery of liquids from the overflow of the settling tank, which liquids may include highly concentrated oily waste as well as water, oil-water emulsions, or water solutions of oily waste materials, or mixtures thereof. Other phase separating techniques would include, but are not limited to, filtration, centrifugation, or decantation. Most preferably, in our process, phase separation refers to pumping the slurries being treated onto a moving belt which is manufactured of a porous material. This belt filter may be an iron, steel or other metallic screen, or a plastic mat or felt or fabric which provides either for vacuum filtration or gravity filtration of the liquid portion of the slurry through the moving porous belt and for means of the collection of both the liquid and solid portions of the slurry on either the surface of the porous moving belt and at the terminal end of the belt. In the process as practiced preferably, the porous belts also are operated such that the liquids passing through the porous moving belt are collected in collection vessels, tanks, tubes, troughs, or the like and either recycled for use in the process or sent to a waste treatment plant to recover oily wastes from the aqueous liquids. The solids collected on the belt are then dumped into a slurrying pot and reslurried for further treatment or alternatively, at the end of the process, are dried and sent to sinter plant for formation of sinter to be recycled into the steel making process and the blast furnaces.

The most improved process for our invention includes a process for de-oiling steel mill generated mill scales to form a dried de-oiled mill scale useful in the manufacture of steel, which process comprises:

(a) collecting mill scale having an oil content above 0.5 weight percent and then, (b) slurrying that portion of mill scale having an oil content above 0.5 weight percent with water to form an aqueous mill scale slurry containing at least 25 weight percent mill scale solids, and then (c) agitating said mill scale slurry to dissolve or disperse easily removed oils contained on the mill scale in the water phase of the slurry, thereby forming a suspension slurry of partially de-oiled mill scale in an oily water phase, and then (d) phase separating the partially de-oiled mill scale from the oily water phase by at least one of the phase separation techniques chosen from at least one of a group consisting of filtration, settling, centrifugation, and decantation; and then (e) collecting and reslurrying the partially de-oiled mill scale obtained after phase separation in fresh water to form a reduced oil mill scale slurry, and collecting and recycling oily waste water phases to be used to make up at least 25 volume percent of the water used to form the aqueous mill scale slurry of step (b); and then (f) high shear, high energy agitating the reduced oil mill scale slurry for a time equal to between 5 minutes and 2 hours at a temperature ranging between about 50° C. to about 90° C., thereby forming a oil-free mill scale suspension in a oily water emulsion; and then (g) phase separating the de-oiled mill scale from the oily water emulsion to form a solid particulate oil-free mill scale and an oily water emulsion; and then (h) fresh water rinsing the solid particulate de-oiled mill scale to form a water washed oil-free mill scale and a waste wash water and then recycling the waste wash water to make up at least a portion of the aqueous mill scale slurry, and then (i) Repeating steps (e) through (h) using at least a portion of the water-washed oil-free mill scale to make up the partially de-oiled mill scale, until at least a major portion of the water washed oil-free mill scale contains less than about 0.5 weight percent oil, and then drying that portion of water washed oil-free mill scale containing less than 0.5 weight percent oil to form a dried oil-free mill scale, and then k) using as at least one source of iron, the dried oil-free mill scale to make steel.

The preferred process also includes the use of an effective de-oiling amount of a surface active agent, surfactant or emulsifier which is added to the process described above at at least one of the process steps (b), (e), and (f).

The operating temperatures above, through every step excepting the drying step, can range between about 5° C. to about 90° C. The drying step itself may be at ambient temperatures or may be at elevated temperatures, upto and including temperatures of 50° C. and above. Drying may occur statically or continuously, intermittently, or even during sintering.

The process of our invention also includes the recovery of the oily waste emulsions that are separated from solid de-oiled mill scales in Step (g) above. The combination of these oily waste emulsions with those portions of oily waste waters collected in step (e), which portions are not recycled and reused to make the aqueous mill scale and the combination with those portions of the wash waters not used to form mill scale slurries can be collected and treated to recover oil, waste oil sludges, and clarified water.

The combination of each of the materials of the oily waste emulsions or the oily waste waters, and the waste wash water form a combined oily waste water emulsion. Treating said combined oily waste water emulsion with an effective amount of an emulsion breaking chemical at sufficient reaction times and temperatures can resolve this combined oily waste water emulsion into an oil containing phase and a water phase. These phases, along with any sludges formed, can be separated into a water phase and an oil phase containing oily sludge solids. We can then collect the oil-sludge phase and burn this phase either recovering energy values thereform or destroying by incineration without energy recovery. Any ash formed by incineration is usually rich in iron values and may also be cycled into the sinter plant as required.

The treated water phase may be used as fresh water for our process or may be sewered.

The emulsion breaking chemical may include but is not limited to multi-valent inorganic cationic salts, such as ferric chloride, aluminum chloride, aluminum hydroxy chloride and may also include cationic polymers, cationic coagulants, or any combination of these inorganic and organic cationic species. Preferably the temperatures of treatment of the combined oily waste emulsions range from about 5° C. to about 95° C.

The high shear mixing processes described above, normally form very stable oil-in-water emulsions which are not easily broken merely by standing for long periods of time particularly when formed in the presence of a surface active agent. Chemical treatment is normally required to break these oil-in-water emulsions and recover low turbidity, low oil-containing water. Of particular value in treating the waste oily emulsions or combination waste oily emulsions are commercial products supplied by Nalco Chemical Company, such as NALCO 7799, NALCO 8100, NALCO 8103, NALCO 8155, NALCO 8158, and various mixtures thereof.

EXAMPLES

To exemplify the process the following tables are presented.

TABLE I

Table I presents the raw oil content of a batch of mill scale derived from a midwestern steel company. The oil content is provided for the samples, screened or unscreened, which pass or are retained on a 12 mesh screen.

TABLE I

| Raw Oil Content of First Batch of Pilot Test Scale[a] | | |
|---|---|---|
| Bucket # | Screened? + or − 12? | Oil Content (%) |
| 8 + 6 | yes, −12 | 0.104 |
| 2 + 6 + 8 | yes, +12 | 0.112 |
| 2 + 8 | yes, −12 | 0.040 |
| 50 | yes, −12 | 0.427 |
| 50 | yes, +12 | 0.206 |
| 21 | yes, +12 | 0.234 |
| 21 | yes, −12 | 0.347 |
| 13 | no | 0.053 |
| 19 | no | 0.067 |
| 20 | no | 0.316 |
| 22 | no | 0.135 |
| 24 | no | 0.176 |
| 25 | no | 0.058 |
| 28 | no | 0.092 |
| 34 | no | 0.217 |
| 40 | no | 0.031 |
| 49 | no | 0.304 |
| 51 | no | 0.327 |
| 53 | no | 0.359 |
| 54 | no | 0.332 |
| 55 | no | 0.233 |
| 56 | no | 0.218 |

[a]Mill scale obtained from "screened pile" near blending operation for mill scale collected in a Midwestern Steel Plant.

TABLE II

The raw oil content of a second batch of mill scale obtained from the same midwestern steel company. In Table II some piles of mill scale were screened through a 12 mesh screen, some piles were screened through a 5 mesh screen and some piles were not screened.

TABLE II

| Raw Oil Content of Second Batch of Pilot Test Scale[a,b] | | |
|---|---|---|
| Bucket # | Screened? + or − 12? | Oil Content (%) |
| 62 | no | 0.903 |
| 16 | no | 0.708 |
| 40 | no | 1.011 |

TABLE II-continued

Raw Oil Content of Second Batch of Pilot Test Scale[a,b]

| Bucket # | Screened? + or − 12? | Oil Content (%) |
|---|---|---|
| 20 | no | 1.155 |
| 64 | no | 0.829 |
| 33 | no | 0.879 |
| 54 | −12 | 0.472 |
| 55 | −12 | 0.446 |
| 55 | 12 | 0.187 |
| 40 | −5 | 0.978 |
| 53 | −12 | 0.458 |
| 53 | 12 | 0.280 |
| 62 | −12 | 1.255 |
| 62 | 12 | 0.721 |
| 20 | −12 | 1.123 |
| 20 | 12 | 0.769 |
| 40 | −12 | 1.209 |
| 40 | 12 | 0.636 |
| 64 | −12 | 1.213 |
| 64 | 12 | 0.896 |
| 20 | −12 | 1.213 |
| 16 | −12 | 0.895 |
| 16 | 12 | 0.649 |
| 16 | −5 | 1.118 |
| 33 | no | 0.921 |
| 60 | no | 0.812 |
| 17 | no | 0.862 |
| 11 | no | 0.882 |
| 66 | no | 1.233 |
| 46 | no | 0.923 |
| 25 | no | 0.940 |
| 14 | no | 1.145 |
| 67 | no | 1.033 |
| 45 | no | 0.751 |
| 7 | no | 0.960 |
| 46 | no | 0.963 |
| 22 | no | 0.981 |
| L-147 | −16 | 0.682 |
| 1 | no | 1.350 |
| 26 | no | 0.919 |
| 58 | no | 0.911 |
| 44 | no | 1.097 |
| 18 | no | 0.950 |
| 4 | no | 0.908 |
| 5 | no | 1.018 |
| 12 | no | 0.682 |
| 65 | no | 0.884 |
| 10 | no | 0.828 |
| 41 | no | 1.015 |
| 24 | no | 0.703 |
| 69 | no | 0.998 |
| 38 | no | 0.898 |
| 47 | no | 1.035 |
| 63 | no | 0.772 |
| 32 | no | 0.757 |
| 29 | no | 0.759 |
| 61 | no | 1.113 |

[a]Mill scale obtained from "screened pile" near blending operation.
[b]Some buckets from first batch were emptied and reused giving the same bucket numbers with different oil contents in Tables I and II.

TABLE III

Density determinations of various mill scale slurries depending upon mill scales ratios.

TABLE III

Density Determination for Varying Water to Scale Ratios[a]

| Ratio (Water:Scale) | Density (g/mL) |
|---|---|
| 3:1 | 1.20 |
| 2:1 | 1.28 |
| 1:1 | 1.60 |
| 1:2 | 1.87 |
| 1:3 | 1.98 |

[a]All densities were determined after the scale/water slurries were shaken and allowed to settle for 5 seconds.

TABLE IV

A D-optimal experimental design which included dosage of surfactant, mixture time and mill scale slurry weight percent solids.

TABLE IV

D-Optimal Experimental Design[a,b]

| Exp't # | Dose | Mix Time | Slurry Solids |
|---|---|---|---|
| 1 | 1 | 0 | 0 |
| 2 | −1 | 1 | −1 |
| 3 | 1 | −1 | 1 |
| 4 | −1 | 0 | 0 |
| 5 | 1 | −1 | −1 |
| 6 | 0 | 0 | −1 |
| 7 | −1 | −1 | 1 |
| 8 | 0 | 1 | 0 |
| 9 | −1 | 1 | 1 |
| 10 | −1 | −1 | −1 |
| 11 | 1 | 1 | −1 |
| 12 | 1 | 1 | 1 |

[a]dose (ppm) 0, 2000, 4000
mixing time (min) 5, 15, 30
slurry solids (wt %) 33, 50, 67
[b]0 = midpoint of a range (e.g., 000 ppm, 15 min, 50 wt % solids)
+1 = higher case in a range
−1 = lower case in a range

TABLE V

The reproducibility of the oil content analysis for a composited mill scale passing a 16 mesh screen. The mill scale was a composite of 19 separate buckets collected in January 1989 at a midwestern steel plant.

TABLE V

Reproducibility of Oil Content Analysis for Composited −16 Mesh Mill Scale[a]

| Date | Oil Content %[b] |
|---|---|
| 1-23-89 | 0.742 |
| " | 0.741 |
| " | 0.733 |
| 1-25-89 | 0.740 |
| " | 0.728 |
| " | 0.728 |
| 1-27-89 | 0.744 |
| " | 0.730 |
| 2-1-89 | 0.730 |
| " | 0.748 |
| " | 0.766 |
| 2-3-89 | 0.740 |
| 2-6-89 | 0.726 |
| " | 0.726 |

[a]−16 Mesh composite of 19 buckets collected 1-12-89.
[b]Average = 0.739%; standard deviation = 0.011%

TABLE VI

This table outlines test conditions for mill scale de-oiling pilot tests run in a pilot Denver attritor at 936 rpm shaft speed with unscreened mill scale (unless otherwise noted). The Table includes the test numbers, the bucket samples obtained from piles of mill scale recovered from a midwestern steel plant, an analysis of an oil contaminated untreated mill scale, mixing times, temperature of operation, the ratio of water to mill scale in the mill scale slurries, the chemical dosage of surfactant used-when used, the presence or absence of a water rinse, the presence or absence of a drying step, and the calculated percentage of oil removal, a calculated percentage of raw and treated mill scale fines, and other information.

In Table VI, mill scale fines are defined as that portion of mill scale passing a 100 mesh screen.

TABLE VI

Test conditions and results from mill scale de-oiling pilot test
All tests run at 940 rpm and with unscreened material unless otherwise noted.
% removed is not an absolute # - it is the % of the total (raw) oil content that is removed by a certain test condition

| test # | bucket used | raw oil % | mix time min | temp (°C.) | water:scale ratio | chem dose ppm | rinse? | dried? how? | sample # | oil % | % removed | init-final oil (%) | oil rem/prod ppm/ppm |
|---|---|---|---|---|---|---|---|---|---|---|---|---|---|
| 6 | 46 | 0.923 | 5 | RT | 1-1 | 2000 | not rinsed | Buchner | 1053 | 0.621 | 32.72 | 0.302 | 1.510 |
| 6 | 46 | 0.923 | 5 | RT | 1-1 | 2000 | reslurry | Buchner | 1054 | 0.574 | 37.81 | 0.349 | 1.745 |
| 7 | 45 | 0.751 | 15 | RT | 1-1 | 2000 | not rinsed | Buchner | 1055 | 0.286 | 61.92 | 0.465 | 2.325 |
| 7 | 45 | 0.751 | 15 | RT | 1-1 | 2000 | reslurry | Buchner | 1056 | 0.206 | 72.57 | 0.545 | 2.725 |
| 8 | 45 | 0.751 | 30 | RT | 1-1 | 2000 | not rinsed | Buchner | 1057 | 0.238 | 68.31 | 0.513 | 2.565 |
| 8 | 45 | 0.751 | 30 | RT | 1-1 | 2000 | reslurry | Buchner | 1058 | 0.127 | 83.09 | 0.624 | 3.120 |
| 9 | 45 | 0.751 | 5 | RT | 1-1 | 2000 | reslurry | Buchner | 1059 | 0.338 | 54.99 | 0.413 | 2.065 |
| 9 | 45 | 0.751 | 5 | RT | 1-1 | 2000 | not rinsed | Buchner | 1060 | 0.401 | 46.60 | 0.350 | 1.750 |
| 10 | 11 | 0.882 | 15 | RT | 1-1 | 0 | reslurry | Buchner | 1061 | 0.420 | 52.38 | 0.462 | |
| 10 | 11 | 0.882 | 15 | RT | 1-1 | 0 | not rinsed | Buchner | 1062 | 0.539 | 38.89 | 0.343 | |
| 11 | 11 | 0.882 | 5 | RT | 1-1 | 0 | reslurry | Buchner | 1063 | 0.480 | 45.58 | 0.402 | |
| 11 | 11 | 0.882 | 5 | RT | 1-1 | 0 | not rinsed | Buchner | 1064 | 0.571 | 35.26 | 0.311 | |
| 12 | 11 | 0.882 | 15 | RT | 1-1 | 4000 | reslurry | Buchner | 1065 | 0.259 | 70.63 | 0.623 | 1.558 |
| 12 | 11 | 0.882 | 15 | RT | 1-1 | 4000 | not rinsed | Buchner | 1066 | 0.359 | 59.30 | 0.523 | 1.308 |
| 13 | 11 | 0.882 | 15 | RT | 2-1 | 2000 | reslurry | Buchner | 1067 | 0.293 | 66.78 | 0.589 | 2.945 |
| 13 | 11 | 0.882 | 15 | RT | 2-1 | 2000 | not rinsed | Buchner | 1068 | 0.333 | 62.24 | 0.549 | 2.745 |
| 14 | 7 | 0.960 | 15 | RT | 1-2 | 2000 | reslurry | Buchner | 1069 | 0.272 | 71.67 | 0.688 | 3.440 |
| 14 | 7 | 0.960 | 15 | RT | 1-2 | 2000 | not rinsed | Buchner | 1070 | 0.418 | 56.46 | 0.542 | 2.710 |
| 15 | 7 | 0.960 | 30 | RT | 2-1 | 2000 | reslurry | Buchner | 1071 | 0.231 | 75.94 | 0.729 | 3.645 |
| 15 | 7 | 0.960 | 30 | RT | 2-1 | 2000 | not rinsed | Buchner | 1072 | 0.289 | 69.90 | 0.671 | 3.355 |
| 16 | 7 | 0.960 | 30 | RT | 2-1 | 0 | reslurry | Buchner | 1073 | 0.369 | 61.56 | 0.591 | |
| 16 | 7 | 0.960 | 30 | RT | 2-1 | 0 | not rinsed | Buchner | 1074 | 0.458 | 52.29 | 0.502 | |
| 17 | 14 | 1.145 | 5 | RT | 1-2 | 4000 | reslurry | Buchner | 1075 | 0.597 | 47.86 | 0.548 | 1.370 |
| 17 | 14 | 1.145 | 5 | RT | 1-2 | 4000 | not rinsed | Buchner | 1076 | 0.684 | 40.26 | 0.461 | 1.153 |
| 18 | 7 | 0.960 | 5 | RT | 2-1 | 4000 | reslurry | Buchner | 1077 | 0.459 | 52.19 | 0.501 | 1.253 |
| 18 | 7 | 0.960 | 5 | RT | 2-1 | 4000 | not rinsed | Buchner | 1078 | 0.500 | 47.92 | 0.460 | 1.150 |
| 19 | 14 | 1.145 | 5 | RT | 1-2 | 0 | reslurry | Buchner | 1079 | 0.674 | 41.14 | 0.471 | |
| 19 | 14 | 1.145 | 5 | RT | 1-2 | 0 | not rinsed | Buchner | 1080 | 0.809 | 29.34 | 0.336 | |
| 20 | 25 | 0.940 | 30 | RT | 1-2 | 0 | reslurry | Buchner | 1081 | 0.254 | 72.98 | 0.686 | |
| 20 | 25 | 0.940 | 30 | RT | 1-2 | 0 | not rinsed | Buchner | 1082 | 0.385 | 59.04 | 0.555 | |
| 21 | 45 | 0.751 | 5 | RT | 2-1 | 0 | reslurry | Buchner | 1084 | 0.333 | 55.66 | 0.418 | |
| 21 | 45 | 0.751 | 5 | RT | 2-1 | 0 | not rinsed | Buchner | 1085 | 0.398 | 47.00 | 0.353 | |
| 22 | 33 | 0.921 | 30 | RT | 2-1 | 4000 | reslurry | Buchner | 1086 | 0.284 | 69.16 | 0.637 | 1.593 |
| 22 | 33 | 0.921 | 30 | RT | 2-1 | 4000 | not rinsed | Buchner | 1087 | 0.351 | 61.89 | 0.570 | 1.425 |
| 23 | 25 | 0.940 | 30 | RT | 1-2 | 4000 | reslurry | Buchner | 1088 | 0.164 | 82.55 | 0.776 | 1.940 |
| 23 | 25 | 0.940 | 30 | RT | 1-2 | 4000 | not rinsed | Buchner | 1089 | 0.306 | 67.45 | 0.634 | 1.585 |
| 24 | 66 | 1.233 | 15 | RT | 1-1 | 4000 | reslurry | Buchner | 1090 | 0.460 | 62.69 | 0.773 | 1.933 |
| 24 | 66 | 1.233 | 15 | RT | 1-1 | 4000 | not rinsed | Buchner | 1091 | 0.540 | 56.20 | 0.693 | 1.733 |
| 25 | 66 | 1.233 | 15 | RT | 1-1 | recycle from 24 | reslurry | Buchner | 1092 | 0.617 | 49.96 | 0.616 | |
| 25 | 66 | 1.233 | 15 | RT | 1-1 | recycle from 24 | not rinsed | Buchner | 1093 | 0.691 | 43.96 | 0.542 | |
| 26 | 66 | 1.233 | 5 | RT | 2-1 | 0 | reslurry | Buchner | 1094 | 0.810 | 34.31 | 0.423 | |
| 26 | 66 | 1.233 | 5 | RT | 2-1 | 0 | not rinsed | Buchner | 1095 | 0.832 | 32.52 | 0.401 | |
| 27 | 22 | 0.981 | 15 | RT | 1-1 | 2000 | double* | Buchner | 1096 | 0.332 | 66.16 | 0.649 | 3.245 |
| 27 | 22 | 0.981 | 15 | RT | 1-1 | 2000 | reslurry* | Buchner | 1097 | 0.351 | 64.22 | 0.630 | 3.150 |
| 28 | 22 | 0.981 | 15 | RT | 1-2 | 4000 | double* | Buchner | 1098 | 0.208 | 78.80 | 0.773 | 1.933 |
| 28 | 22 | 0.981 | 15 | RT | 1-2 | 4000 | reslurry* | Buchner | 1099 | 0.274 | 72.07 | 0.707 | 1.768 |
| 29 | 67 | 1.038 | 15 | RT | 1-1 | 2000 | reslurry | Buchner | 1100 | 0.407 | 60.79 | 0.631 | 3.155 |
| 29 | 67 | 1.038 | 15 | RT | 1-1 | 2000 | not rinsed | Buchner | 1101 | 0.473 | 54.43 | 0.565 | 2.825 |
| 30 | 66/49 | 0.599 | 15 | RT | 1-1 | 2000 | reslurry | Buchner | 1102 | 0.254 | 57.60 | 0.345 | 1.725 |
| 30 | 66/49 | 0.599 | 15 | RT | 1-1 | 2000 | not rinsed | Buchner | 1103 | 0.285 | 52.42 | 0.314 | 1.570 |
| 31 | L-147 | 0.682 | 15 | RT | 1-1 | 2000 | reslurry | Buchner | 1105 | 0.411 | 39.74 | 0.271 | 1.355 |
| 31 | L-147 | 0.682 | 15 | RT | 1-1 | 2000 | not rinsed | Buchner | 1106 | 0.447 | 34.46 | 0.235 | 1.175 |
| 32 | L-147 | 0.682 | 30 | RT | 1-1 | 4000 | reslurry | Buchner | 1107 | 0.307 | 54.99 | 0.375 | 0.938 |
| 32 | L-147 | 0.682 | 30 | RT | 1-1 | 4000 | not rinsed | Buchner | 1108 | 0.352 | 48.39 | 0.330 | 0.825 |
| 33 | 67 | 1.038 | 15 | RT | 1-1 | 4000 | reslurry | Buchner | 1109 | 0.187 | 81.98 | 0.851 | 2.128 |
| 33 | 67 | 1.038 | 15 | RT | 1-1 | 4000 | not rinsed | Buchner | 1110 | 0.223 | 78.52 | 0.815 | 2.038 |
| 34 | 22/49 | 0.500 | 15 | RT | 1-1 | 2000 | reslurry | Buchner | 1111 | 0.189 | 62.20 | 0.311 | 1.555 |
| 34 | 22/49 | 0.500 | 15 | RT | 1-1 | 2000 | not rinsed | Buchner | 1112 | 0.215 | 57.00 | 0.285 | 1.425 |
| 35 | 22/49 | 0.401 | 15 | RT | 1-1 | 2000 | reslurry | Buchner | 1113 | 0.112 | 72.07 | 0.289 | 1.445 |
| 35 | 22/49 | 0.401 | 15 | RT | 1-1 | 2000 | not rinsed | Buchner | 1114 | 0.143 | 64.34 | 0.258 | 1.290 |
| 36 | 67 | 1.038 | 15 | RT | 1-1 | 1000 | reslurry | Buchner | 1115 | 0.482 | 53.56 | 0.556 | 5.560 |
| 36 | 67 | 1.038 | 15 | RT | 1-1 | 1000 | not rinsed | Buchner | 1116 | 0.561 | 45.95 | 0.477 | 4.770 |
| 37 | 1 | 1.350 | 15 | 160 | 1-1 | 0 | reslurry | Buchner | 1118 | 0.437 | 67.63 | 0.913 | |
| 37 | 1 | 1.350 | 15 | 160 | 1-1 | 0 | not rinsed | Buchner | 1119 | 0.573 | 57.56 | 0.777 | |
| 38 | 1 | 1.350 | 15 | 160 | 1-1 | 2000 | reslurry | Buchner | 1120 | 0.344 | 74.52 | 1.006 | 5.030 |
| 38 | 1 | 1.350 | 15 | 160 | 1-1 | 2000 | not rinsed | Buchner | 1121 | 0.922 | 31.70 | 0.428 | 2.140 |
| 39 | 26 | 0.919 | 15 | RT | 1-1 | 4000 | reslurry | Buchner | 1124 | 0.292 | 68.23 | 0.627 | 1.568 |
| 39 | 26 | 0.919 | 15 | RT | 1-1 | 4000 | not rinsed | Buchner | 1125 | 0.378 | 58.87 | 0.541 | 1.353 |
| 40 | 26 | 0.919 | 15 | RT | 1-1 | 1000 | reslurry | Buchner | 1126 | 0.356 | 61.26 | 0.563 | 5.630 |
| 40 | 26 | 0.919 | 15 | RT | 1-1 | 1000 | not rinsed | Buchner | 1127 | 0.438 | 52.34 | 0.481 | 4.810 |
| 41 | 67 | 1.038 | 15 | RT | 1-1 | 2000 | reslurry | Buchner | 1128 | 0.600 | 42.20 | 0.438 | 2.190 |
| 41 | 67 | 1.038 | 15 | RT | 1-1 | 2000 | not rinsed | Buchner | 1129 | 0.646 | 37.76 | 0.392 | 1.960 |
| 42 | 58 | 0.911 | 30 | RT | 1-1 | 1000 | reslurry | Buchner | 1130 | 0.327 | 64.11 | 0.584 | 5.840 |
| 42 | 58 | 0.911 | 30 | RT | 1-1 | 1000 | not rinsed | Buchner | 1131 | 0.402 | 55.87 | 0.509 | 5.090 |
| 43 | 26 | 0.919 | 15 | RT | 1-1 | water from 39 | reslurry | Buchner | 1132 | 0.330 | 64.09 | 0.589 | |
| 43 | 26 | 0.919 | 15 | RT | 1-1 | water from 39 | not rinsed | Buchner | 1133 | 0.513 | 44.18 | 0.406 | |

TABLE VI-continued

| | | | | | | | | | | | | | |
|---|---|---|---|---|---|---|---|---|---|---|---|---|---|
| 44 | 58 | 0.911 | 15 | RT | 1-1 | 4000 | reslurry* | Buchner | 1134 | 0.271 | 70.25 | 0.640 | 1.600 |
| 44 | 58 | 0.911 | 15 | RT | 1-1 | 4000 | not rinsed* | Buchner | 1135 | 0.287 | 68.50 | 0.624 | 1.560 |
| 45 | 1/26 | 1.266 | 15 | RT | 1-2 | 0 | reslurry | Buchner | 1136 | 0.475 | 62.48 | 0.791 | |
| 45 | 1/26 | 1.266 | 15 | RT | 1-2 | 0 | not rinsed | Buchner | 1137 | 0.526 | 58.45 | 0.740 | |
| cts | 44/5 | 1.058 | 15 | RT | 1-1 | 4000 | reslurry | Buchner | 1155 | 0.537 | 49.24 | 0.521 | |
| cts | 44/5 | 1.058 | 15 | RT | 1-1 | 4000 | reslurry | Buchner | 1156 | 0.436 | 58.79 | 0.622 | |
| cts | 44/5 | 1.058 | 15 | RT | 1-1 | 4000 | reslurry | Buchner | 1157 | 0.477 | 54.91 | 0.581 | |
| cts | 44/5 | 1.058 | 15 | RT | 1-1 | 4000 | reslurry | Buchner | 1158 | 0.108 | 89.79 | 0.950 | |
| prod run 2nd try | | | 15 | RT | 1-2 | 4000 | 2 rinses in attritter | Buchner | 1159 | 0.142 | | | |
| " | | | 15 | RT | 1-2 | 4000 | 2 rinses in attritter | Buchner | 1160 | 0.196 | | | |
| " | | | 15 | RT | 1-2 | 4000 | 2 rinses in attritter | Buchner | 1161 | 0.202 | | | |
| " | | | 15 | RT | 1-2 | 4000 | 2 rinses in attritter | Buchner | 1162 | 0.111 | | | |
| " | | | 15 | RT | 1-2 | 4000 | 2 rinses in attritter | Buchner | 1167 | 0.190 | | | |
| " | | | 15 | RT | 1-2 | 4000 | 2 rinses in attritter | Buchner | 1168 | 0.174 | | | |
| " | | | 15 | RT | 1-2 | 4000 | 2 rinses in attritter | Buchner | 1169 | 0.143 | | | |
| " | | | 15 | RT | 1-2 | 4000 | 2 rinses in attritter | Buchner | 1170 | 0.164 | | | |
| " | | | 15 | RT | 1-2 | 4000 | 2 rinses in attritter | Buchner | 1171 | 0.168 | | | |
| " | | | 15 | RT | 1-2 | 4000 | 2 rinses in attritter | Buchner | 1172 | 0.160 | | | |
| " | | | 15 | RT | 1-2 | 4000 | 2 rinses in attritter | Buchner | 1173 | 0.141 | | | |
| " | | | 15 | RT | 1-2 | 4000 | 2 rinses in attritter | Buchner | 1174 | 0.213 | | | | oil content analysis by freon extraction followed by fixed filter in (DAP)
water content analysis by Dean-Stark analysis
fines production - extract oil by Soxhlet extraction, dry, sieve to +/− 100 mesh

| test # | bucket(s) used | sample # | raw fines % −100 | treated % −100 | treated − raw | comments |
|---|---|---|---|---|---|---|
| 6 | 46 | 5002 | 13.34 | 17.68 | 4.34 | tests after and including #6 run with one cell only |
| 6 | 46 | | 13.34 | 15.32 | 1.98 | |
| 7 | 45 | 5003 | 11.54 | 18.76 | 7.22 | |
| 7 | 45 | | 11.54 | 17.08 | 5.54 | |
| 8 | 45 | 5004 | 11.54 | 21.68 | 10.14 | |
| 8 | 45 | | 11.54 | 22.37 | 10.83 | |
| 9 | 45 | | | | | |
| 9 | 45 | 5005 | 11.54 | 14.72 | 3.18 | |
| 10 | 11 | | | | | |
| 10 | 11 | 5006 | 12.88 | 19.03 | 6.15 | |
| 11 | 11 | | | | | |
| 11 | 11 | 5007 | 12.88 | 15.68 | 2.80 | |
| 12 | 11 | | | | | |
| 12 | 11 | 5008 | 12.88 | 21.84 | 8.96 | |
| 13 | 11 | | 12.88 | 21.41 | 8.53 | |
| 13 | 11 | 5010 | 12.88 | 21.59 | 8.71 | |
| 14 | 7 | | 11.42 | 21.11 | 9.69 | |
| 14 | 7 | 5011 | 11.42 | 21.51 | 10.09 | |
| 15 | 7 | | 11.42 | 19.87 | 8.45 | |
| 15 | 7 | | | | | Part of sample lost-numbers not reliable. |
| 16 | 7 | | | | | |
| 16 | 7 | 5013 | 11.42 | 22.29 | 10.87 | |
| 17 | 14 | | | | | |
| 17 | 14 | 5014 | 15.22 | 16.34 | 1.12 | |
| 18 | 7 | | 11.42 | 16.90 | 5.48 | |
| 18 | 7 | 5015 | 11.42 | 12.87 | 1.45 | |
| 19 | 14 | | | | | |
| 19 | 14 | 5017 | 15.22 | 16.74 | 1.52 | |
| 20 | 25 | | 13.59 | 23.84 | 10.25 | |
| 20 | 25 | 5018 | 13.59 | 24.09 | 10.50 | |
| 21 | 45 | | | | | |
| 21 | 45 | 5022 | 11.54 | 12.82 | 1.28 | |
| 22 | 33 | | | | | |
| 22 | 33 | 5023 | 13.27 | 25.02 | 11.75 | |
| 23 | 25 | | | | | |
| 23 | 25 | 5024 | 13.59 | 24.14 | 10.55 | |
| 24 | 66 | | | | | |
| 24 | 66 | 5025 | 16.63 | 16.55 | | |
| 25 | 66 | | | | | |
| 25 | 66 | 5026 | 16.63 | 20.63 | 4.00 | |
| 26 | 66 | | | | | |
| 26 | 66 | 5027 | 16.63 | 17.60 | 0.97 | |
| 27 | 22 | | | | | *reslurry in attritter 30 sec |
| 27 | 22 | 5028 | 15.77 | 21.06 | 5.29 | |

TABLE VI-continued

| | | | | | |
|---|---|---|---|---|---|
| 28 | 22 | | | | |
| 28 | 22 | 5029 | 15.77 | 17.81 | 2.04 |
| 29 | 67 | | | | |
| 29 | 67 | 5030 | 15.55 | 24.06 | 8.51 |
| 30 | 66/49 | | | | |
| 30 | 66/49 | 5031 | 14.35 | 20.63 | 6.28 |
| 31 | L-147 | | | | |
| 31 | L-147 | 5034 | 18.27 | 22.85 | 4.58 |
| 32 | L-147 | | | | |
| 32 | L-147 | 5035 | 18.27 | 23.94 | 5.67 |
| 33 | 67 | | | | |
| 33 | 67 | 5039 | 15.55 | 24.32 | 8.77 |
| 34 | 22/49 | | | | |
| 34 | 22/49 | 5040 | 14.01 | 23.32 | 9.31 |
| 35 | 22/49 | | | | |
| 35 | 22/49 | 5041 | 13.64 | 22.91 | 9.27 |
| 36 | 67 | | | | |
| 36 | 67 | 5042 | 15.55 | 25.15 | 9.60 |
| 37 | 1 | | | | |
| 37 | 1 | 5044 | 13.86 | 22.19 | 8.33 |
| 38 | 1 | | | | |
| 38 | 1 | 5045 | 13.86 | 15.54 | 1.68 |
| 39 | 26 | | | | |
| 39 | 26 | 5053 | 11.97 | 20.39 | 8.42 |
| 40 | 26 | | | | |
| 40 | 26 | 5054 | 11.97 | 19.55 | 7.58 |
| 41 | 67 | | | | |
| 41 | 67 | 5055 | 15.55 | 20.48 | 4.93 |
| 42 | 58 | | | | |
| 42 | 58 | 5056 | 11.76 | 25.67 | 13.91 |
| 43 | 26 | | | | |
| 43 | 26 | 5057 | 11.97 | 20.63 | 8.66 |
| 44 | 58 | | | | |
| 44 | 58 | 5058 | 11.76 | 17.46 | 5.70 |
| 45 | 1/26 | | | | |
| 45 | 1/26 | 5059 | 13.49 | 17.80 | 4.31 |
| cts | 44/5 | 5065 | | | |
| cts | 44/5 | 5066 | | | |
| cts | 44/5 | 5067 | | 33.33 | |
| cts | 44/5 | 5068 | | | |
| prod run 2nd try | | | | | |

*reslurry in attritter 30 sec pre-wash 30 sec in attritter 31.8% bucket 66, 68.2% bucket 49 scale used is 2914-147 = −16 mesh scale obtained from "screened pile" 1-12-89 scale used is 2914-147 = −16 mesh scale obtained from "screened pile" 1-12-89

28.9% bucket 22, 71.1% bucket 49

14.3% bucket 22, 85.7% bucket 49

*reslurry in attritter 30 sec 19.4% bucket 26, 80.6% bucket 1 scale for pot sinter test, a total of approximately 1000 lb

TABLE VII

Table VII presents a comparison of oil content analysis performed by the inventors or their associates (Test Procedure "A") compared to the analytical procedure (Test Procedure "B") used on the same samples as performed by representatives of the steel company from which the samples were derived. The analysis performed by the inventors included an extraction using a Soxhlet device of a preweighed sample of mill scale, said extraction being accomplished by using a fluorochlorocarbon, Freon-113, and then measuring by infrared spectrophototometry the absorbance of a portion of the extract at a fixed frequency appropriate for carbon hydrogen bond excitation and comparing said absorbance to that of known concentrations of oil in freon standards.

TABLE VII

Comparison of Oil Content Analysis for Replicate Raw And Treated Mill Scale Samples

| | Oil Content[a,b] | |
|---|---|---|
| Sample # | Test Procedure "A" | Test Procedure "B" |
| 2988-24-1 | 0.142 | 0.09, 0.10 |
| 2988-24-2 | 0.757 | 0.50, 0.57 |
| 2988-24-3 | 0.160 | 0.11, 0.13 |
| 2988-24-4 | 0.196 | 0.14, 0.16 |
| 2988-24-5 | 1.113 | 1.0, 0.94 |
| 2988-24-6 | 0.919 | 0.82, 0.71 |
| 2988-24-7 | 0.141 | 0.14, 0.11 |
| 2988-24-8 | 0.202 | 0.16, 0.16 |
| 2988-24-9 | 0.213 | 0.17, 0.17 |
| 2988-24-10 | 0.111 | 0.09, 0.10 |
| 2988-24-11 | 0.190 | 0.17, 0.14 |
| 2988-24-12 | 0.168 | 0.14, 0.13 |
| 2988-24-13 | 0.174 | 0.114, 0.11 |
| 2988-24-14 | 0.911 | 0.744, 0.78, 0.776 |
| 2988-24-15 | 0.164 | 0.126, 0.12, 0.115 |

TABLE VII-continued

Comparison of Oil Content Analysis for Replicate Raw And Treated Mill Scale Samples

| Sample # | Oil Content[a,b] | |
|---|---|---|
| | Test Procedure "A" | Test Procedure "B" |
| 2988-24-16 | 0.143 | 0.102, 0.08 |

[a] Multiple entries indicate multiple determinations on the sample.
[b] Typical standard deviation = 0.01% oil for scale having 0.5% oil for Test Procedure "A".

TABLE VIII

This Table presents average oil content and standard deviations of replicate mill scale samples from the freon Soxhlet extraction -I.R. spectrophotometric analytical technique.

TABLE VIII

Average Oil Contents of Composites and Screened Fraction from 19 Statistical Samples of "Screened Pile" Mill Scale.

| Fraction | Oil Content (%) | $\sigma$ (% oil) |
|---|---|---|
| +5 | 0.145 | 0.046 |
| +6 | 0.163 | 0.061 |
| −5 + 16 | 0.313 | 0.088 |
| −6 + 16 | 0.322 | 0.084 |
| −16 | 0.751 | 0.118 |
| composite | 0.540 | 0.099 |
| calculated composite | 0.519 | 0.083 |

TABLE IX

This Table presents the results of oil content analysis of mill scale prepared for a sinter pot test to determine if de-oiled mill scale containing about 0.2 weight percent oil is sufficient for reuse in the sinter mill prior to feed to the blast furnace without presenting environmental or operational problems.

TABLE IX

Results of Oil Content Analysis of Scale Prepared for a Sinter Pot Test.

| Sample # | Oil Content[a,b] (%) |
|---|---|
| 1159 | 0.142 |
| 1160 | 0.196 |
| 1161 | 0.202 |
| 1162 | 0.111 |
| 1167 | 0.190 |
| 1168 | 0.174 |
| 1169 | 0.143 |
| 1170 | 0.164 |
| 1171 | 0.168 |
| 1172 | 0.160 |
| 1173 | 0.141 |
| 1174 | 0.213 |

[a] Treatment conditions: 15 min. 4000 ppm chemical surfactant 1:2 water: scale ratio both attritor chambers used, batch operation, followed by two fresh water rinses in the attritor.
[b] Average oil content = 0.167%.

TABLE X

Table X presents the HLB's of certain of the chemical surfactants which have been tested in the above process.

TABLE X

| Product (a) | HLB of Chemistries Used | |
|---|---|---|
| | HLB | Commercial Product |
| A. | 10.8 | IGEPAL CO-530 |
| B. | 10.0 | IGEPAL CO-520 |
| C. | 9.4 | IGEPAL DM-430 |
| D. | 12.2 | IGEPAL CO-610 |
| E. | 13.5 | Triton X-100 |

HLB of other chemistries currently unknown.
(a) The active ingredients in Products above are:
A is nonyl phenoxy polyoxyethylene ethanol
B is a polyoxyethylene derivative
C is a dialkyl phenoxy poly(ethylene oxy) ethanol
D is a nonyl phenoxy poly(ethylene oxy) ethanol
E is an octylphenoxypolyethoxyethane

A BRIEF DESCRIPTION OF THE DRAWINGS

Figure 20:
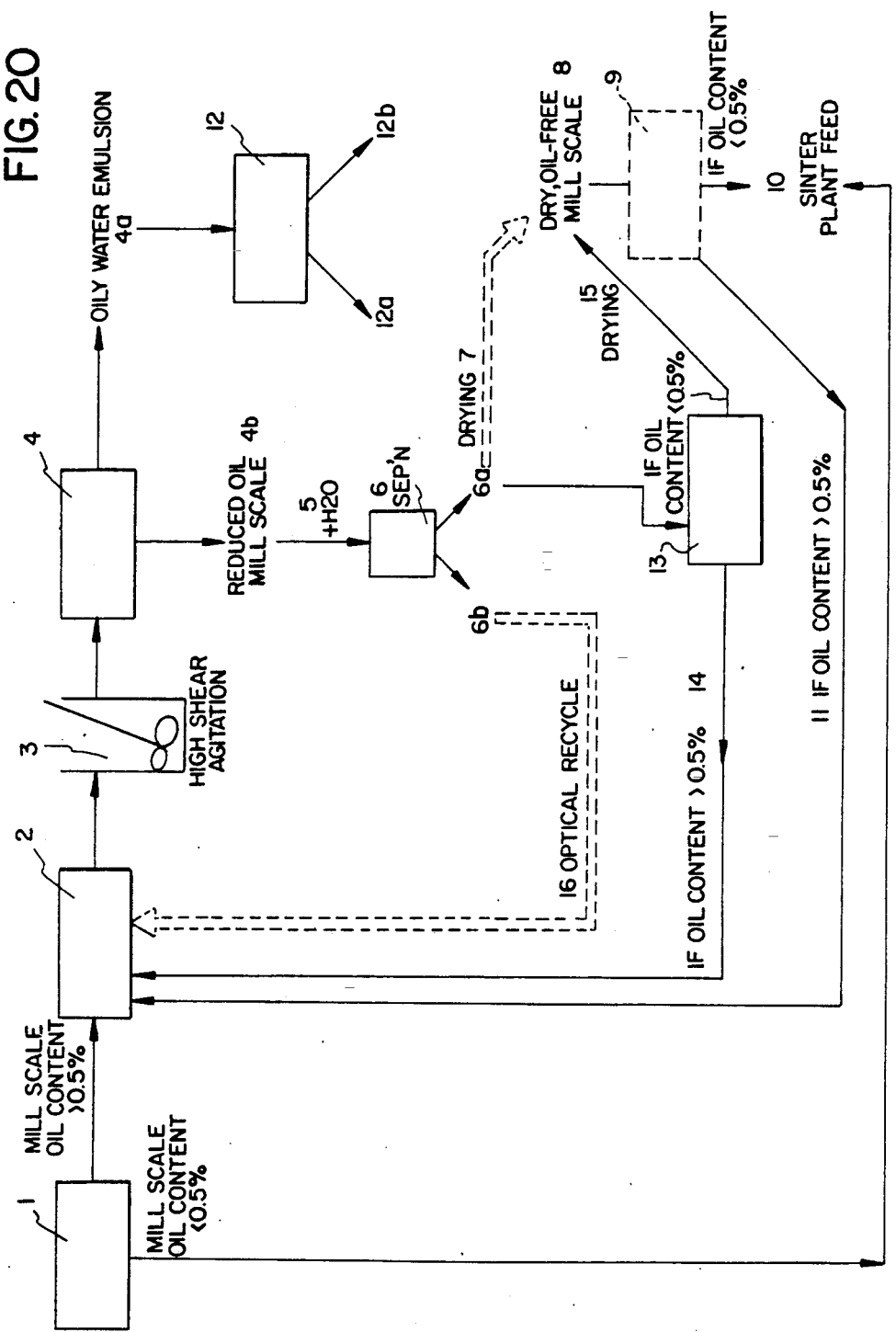
Figure 21:
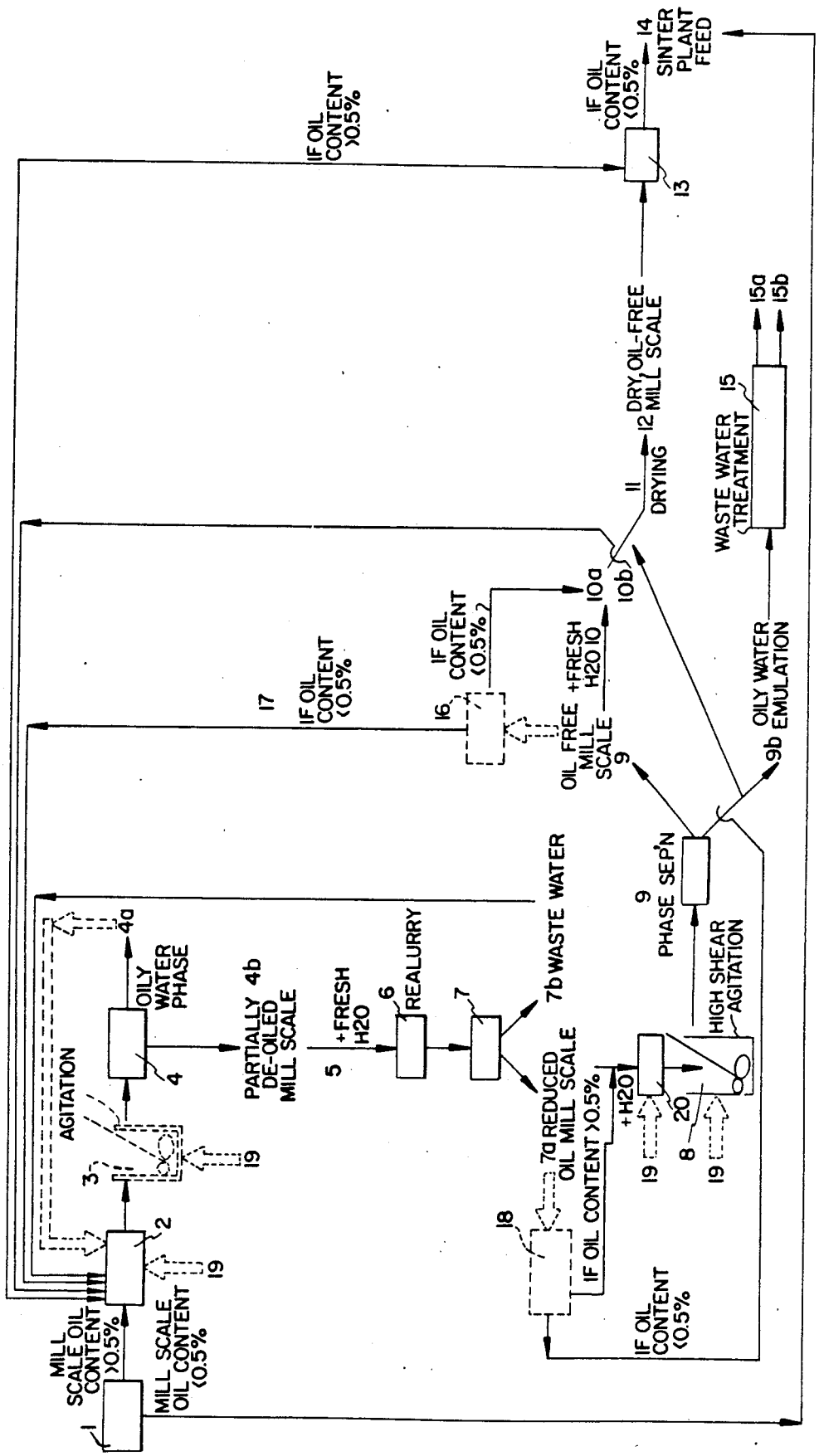

FIGS. 1-21 present information and data generated from various experiments demonstrating the effectiveness of the instant process. Particular note is called to FIGS. 20 and 21 which present simplified process drawings of our invention and also various options and preferred operations of our processes.

To further describe the invention the following figures are presented. Process Drawing #1 and Process Drawing #2, earlier presented, provide proposed line diagrams of the processes anticipated by this invention. Process Drawing #1 presents a simplified process of this invention, while Process Drawing #2 provides various options and preferred operations.

FIG. 1 presents the results achieved from de-oiling a mill scale obtained from an eighty inch hot mill rolling operation at the midwestern steel manufacturer. Contact times were fifteen minutes for the high energy high shearing mix operation and treatment was with or without a surfactant, used at concentrations ranging from 10,000 ppm up to and including 60,000 ppm.

Figure 2:
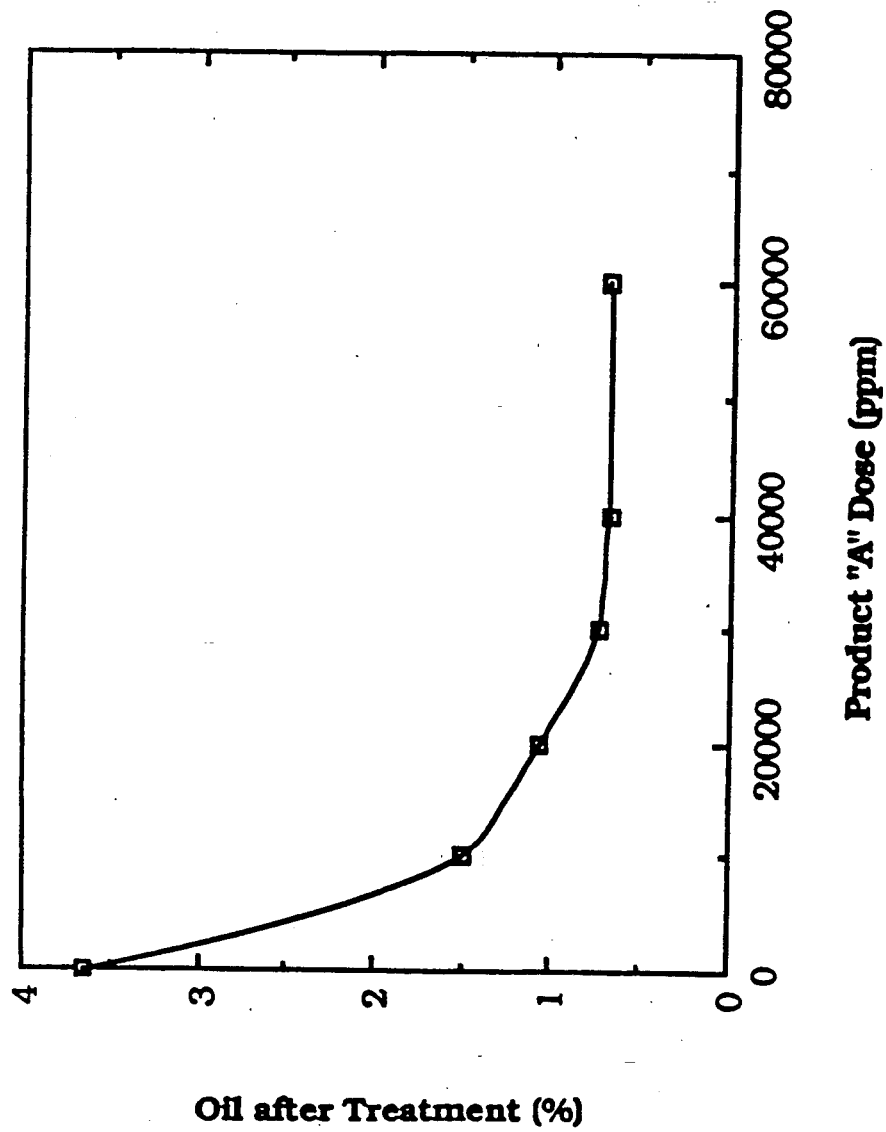

FIG. 2 presents the results obtained by de-oiling mill scale at constant contact times in the high shear mixing device which, for laboratory testing of all of these results was a Heller HST 20 torque mixer capable of achieving propeller speeds of 1350 revolutions per minute, and above. FIG. 2 shows the effectiveness of a nonionic surfactant, Product "A" from Table X, in assisting the removal of oil from mill scale.

Figure 3:
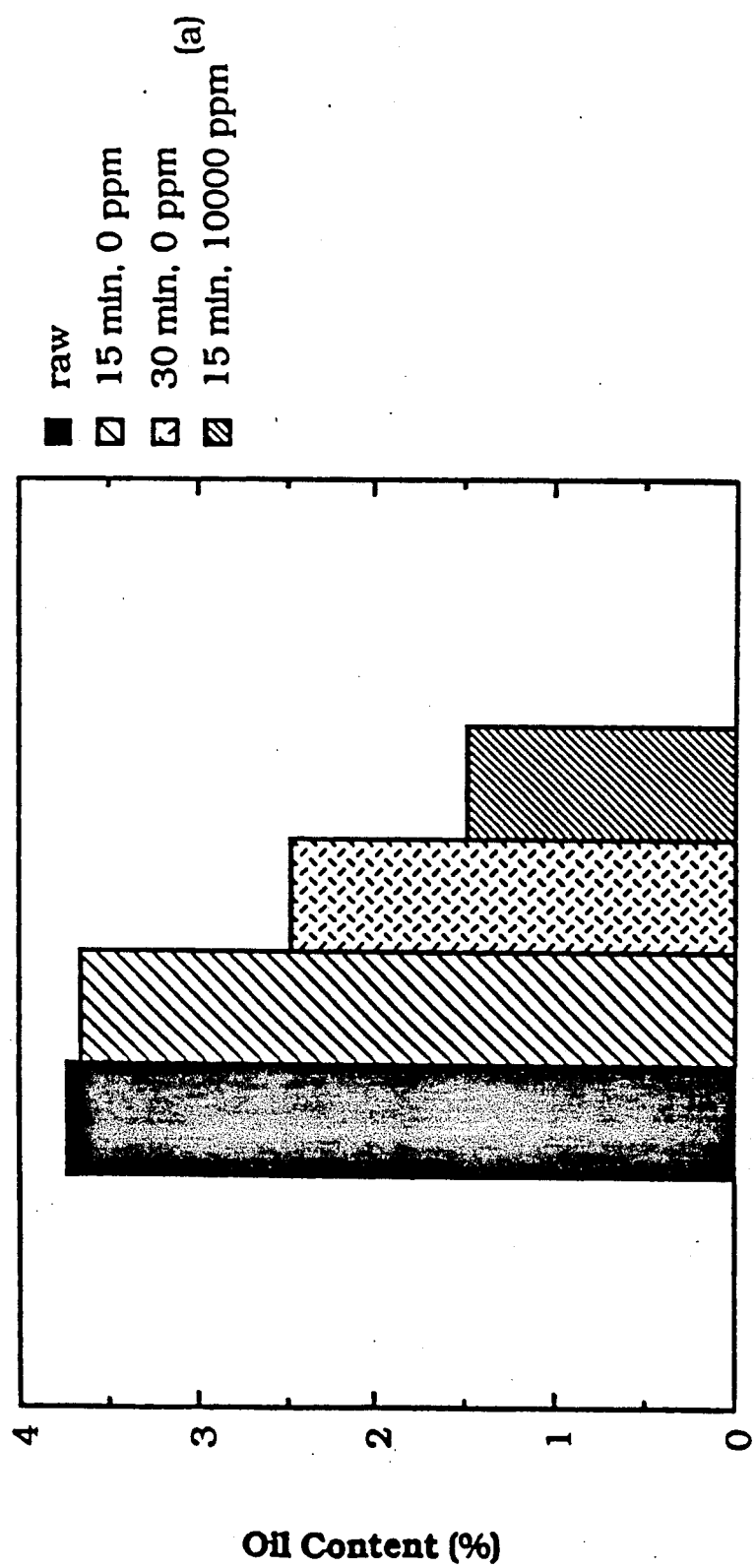
Figure 4:
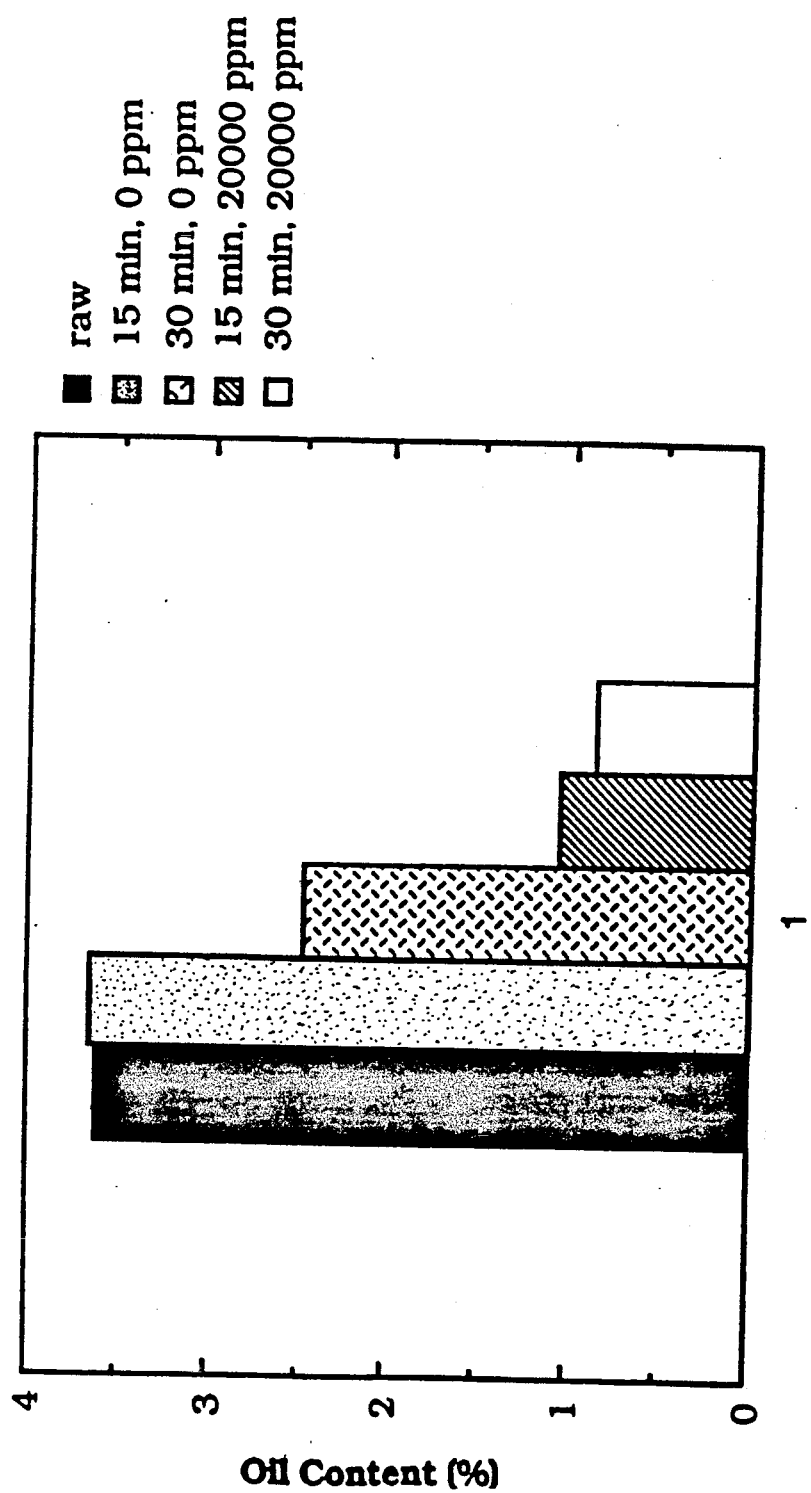

FIG. 3 presents the results obtained from de-oiling mill scale recovered from an eighty inch hot mill rolling operation, and shows, at 1350 RPM using the Heller HST 20 torque mixer, that an increase in time increases the recovery of oil from a mill scale, and also shows that treatment with an nonionic surfactant increases recovery of oil from mill scale at shorter contact time than without chemical.

FIG. 4 again uses a mill scale obtained from an eighty inch hot mill rolling operation in high energy high shear mixing using the Heller torque mixer described above at various times and using various amounts of a nonionic surfactant.

Figure 5:
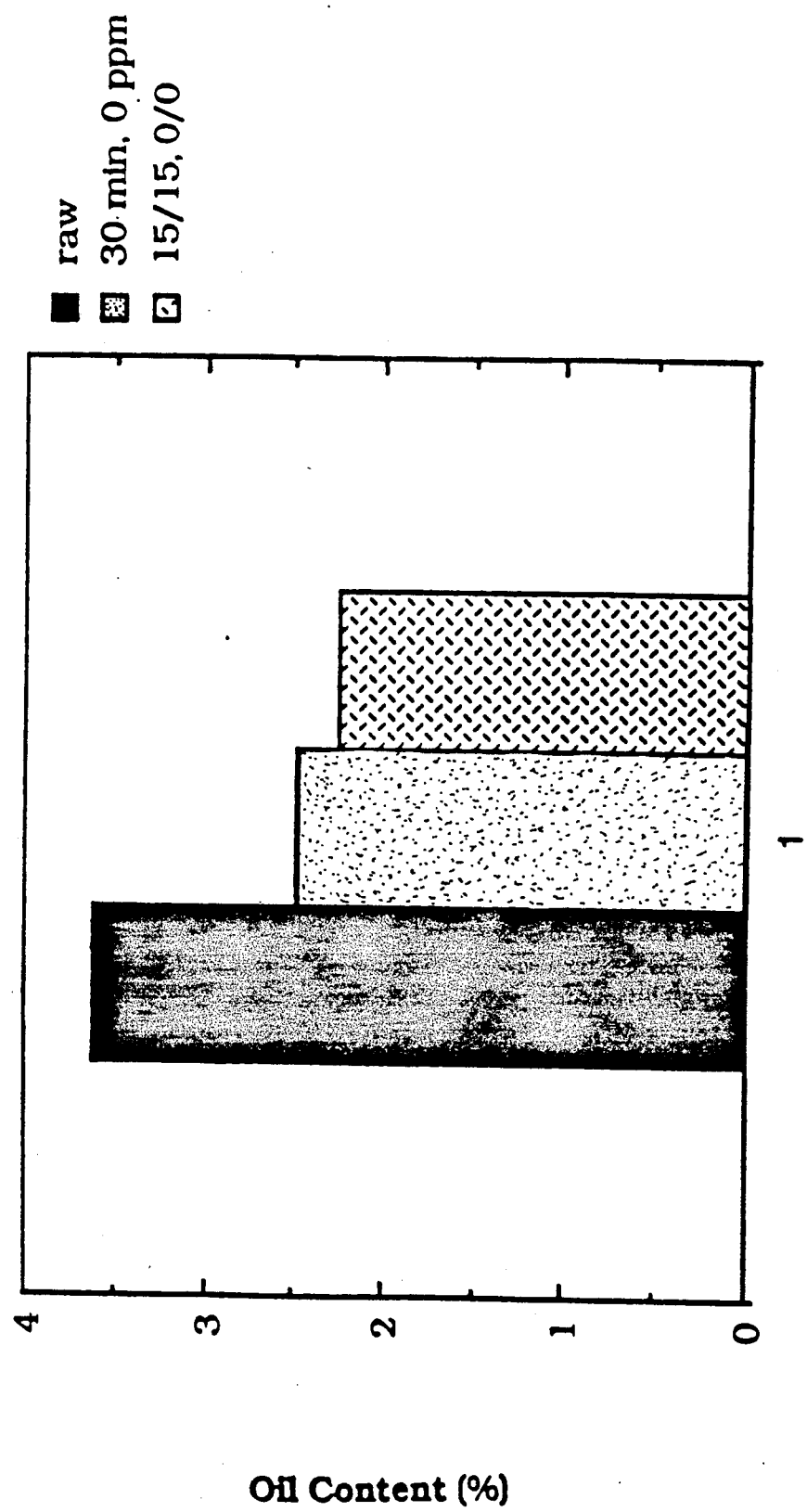
Figure 6:
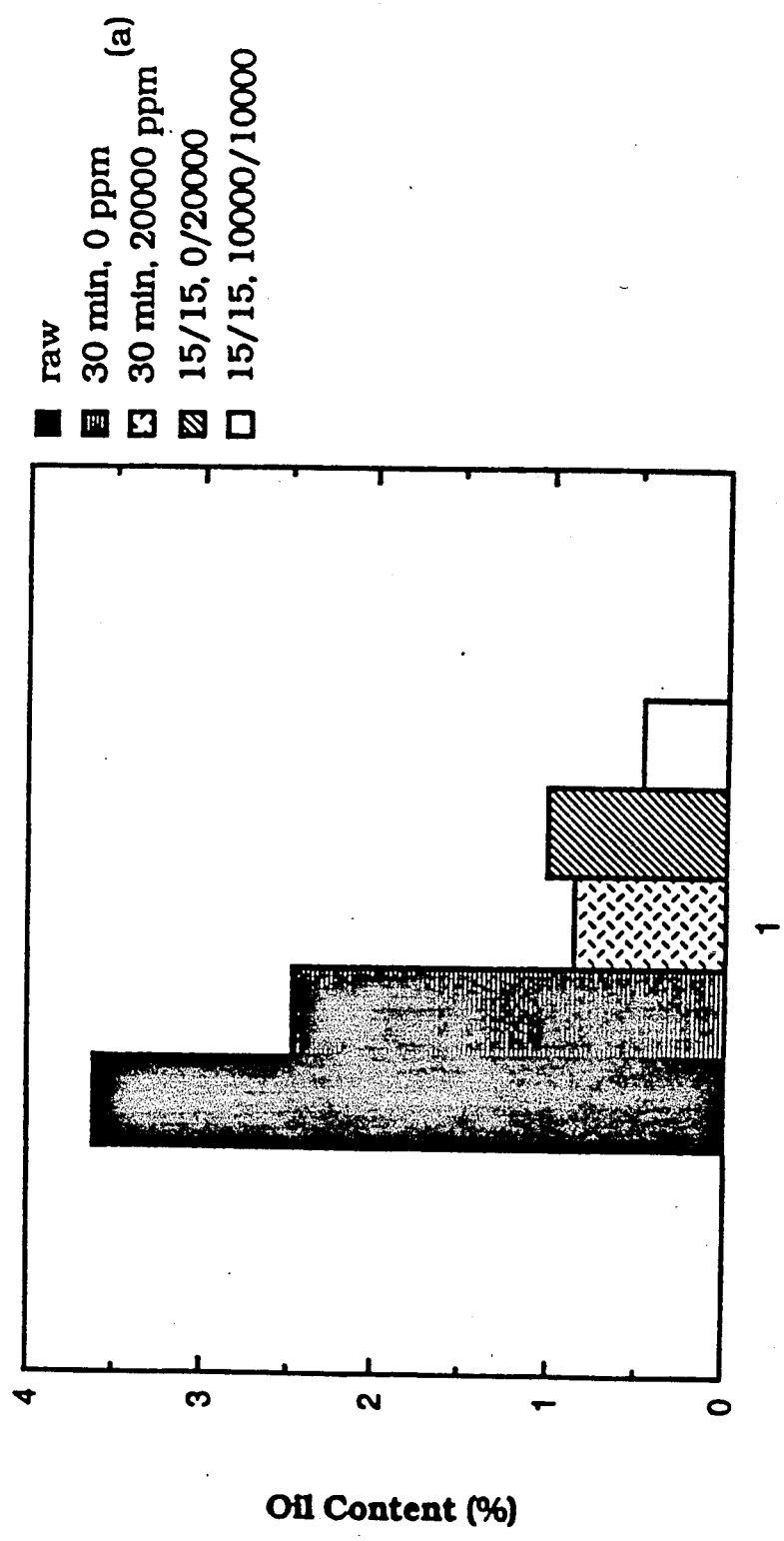

FIG. 5 shows the effect of two separate fifteen-minute washings compared to one wash of thirty minutes at the same energy with no chemical treatment. This figure indicates that better results may be obtained by treating the mill scale slurries with high energy, high shear mixing in a multiple unit mode of operation, even in the absence of a surface active treatment chemical.

FIG. 6 again shows a comparison of multiple unit operations of high shear, high energy mixing versus a single unit operation but this time with and without chemical treatment using a nonionic surfactant, Product "A".

Figure 7:
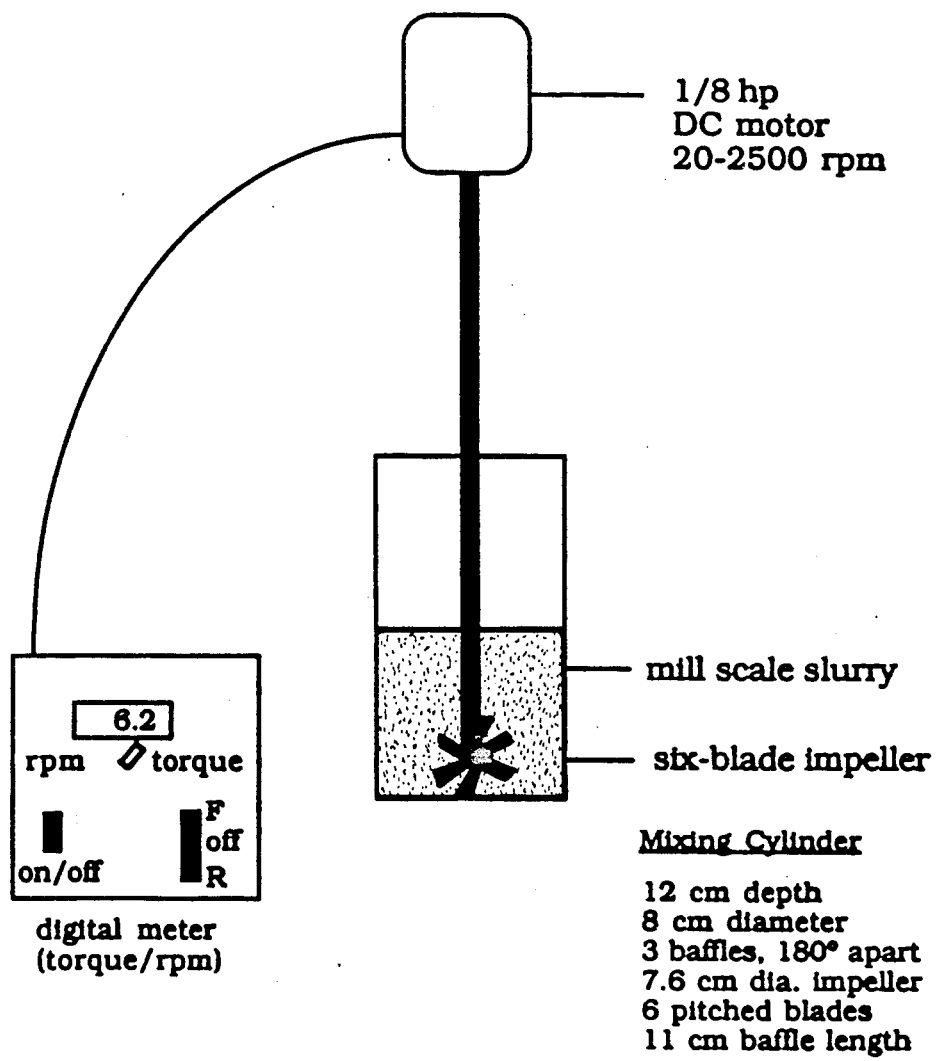

FIG. 7 shows a diagram of the Heller HST 20 torque mixer and the operations used in the laboratory for the tests presented in tables 1 thru 6 and the FIGS. 1 thru 6, as well as FIGS. 10 through 19.

Figure 8:
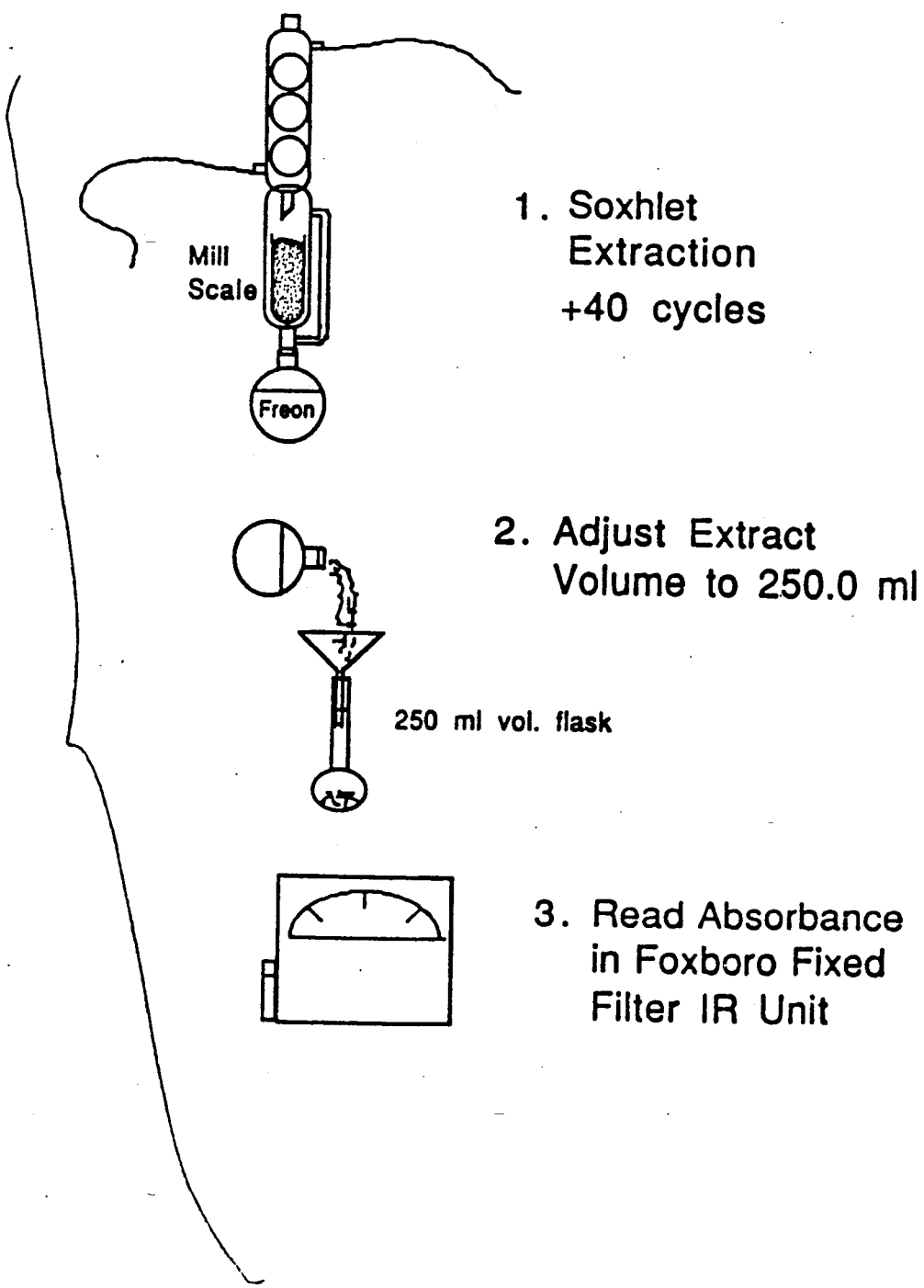

FIG. 8 shows diagrams of the Soxhlet extraction used to determine oil content of mill scale and various treated mill scales. The extraction was done using a fluoro chlorocarbon commonly referred to as freon. Mill scale oil extract was obtained by continuous extraction of the composited mill scale with freon in the Soxhlet apparatus for at least forty complete cycles of the volume of freon originally used. The freon extract was evaporated in a 60° C. degree water bath to yield an actual recovered oil. Known weights of this oil in freon were prepared and infra-red absorption of each aliquot solutions was measured on a Foxboro Miran Fixed filter infra-red unit. These absorbances and the corresponding concentrations of oil were used to prepare a standard curve for subsequent oil analysis. These subsequent analyses were performed on freon extracts of raw and treated mill scales by measuring the absorbance of the oil-containing extract and comparing to the standard curve.

Figure 9:
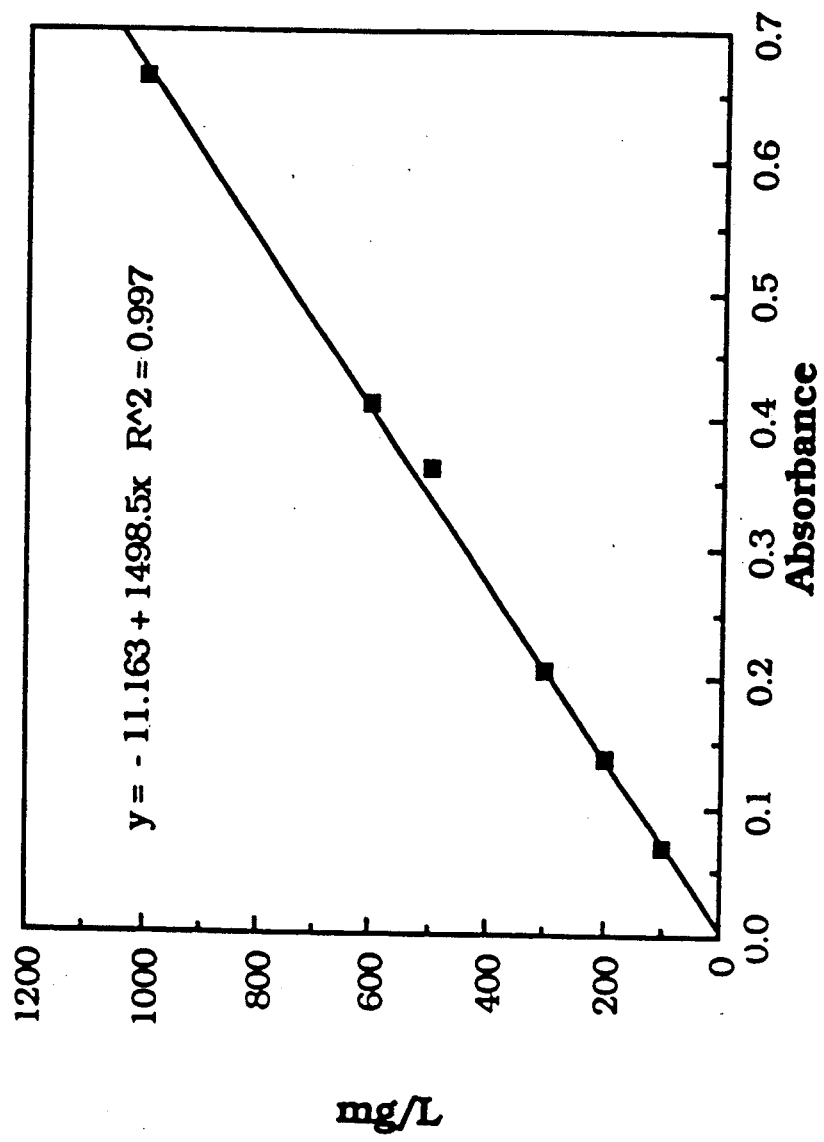

FIG. 9 presents a typical calibration curve for oil contained on a mill scale obtained from a "screened pile".

Smaller particles of mill scale have higher oil content than do larger particles. Our results indicate that a fraction of mill scale which does not pass the 16 mesh sieve contained an average of 0.265 weight percent oil while that portion which passes a 16 mesh screen contains an average of 0.751 weight percent oil. Of a particular composited sample, over 40 weight percent of the scale was retained on the 16 mesh screen. The oil content of a mill scale which is retained on a 16 mesh screen might possibly be suitable for recycle directly into the sinter plant. It is very likely that a mill scale retained on a 5 or 6 mesh screen sieve would be sufficiently low in oil content to be recycled directly to a sinter plant. Table VIII above presents the average oil content of various mill scale composites in screen fractions from 19 statistical samples of a so called "screen pile" mill scale. As one can see the oil content as determined by the freon extraction technique described above is below 0.2 weight percent if the particle is retained on a 5 or 6 mesh screen, but increases if the particle passes 5 but is retained on a 16 mesh screen, and increases even further if the particle passes through a 16 mesh screen.

Figure 10A:
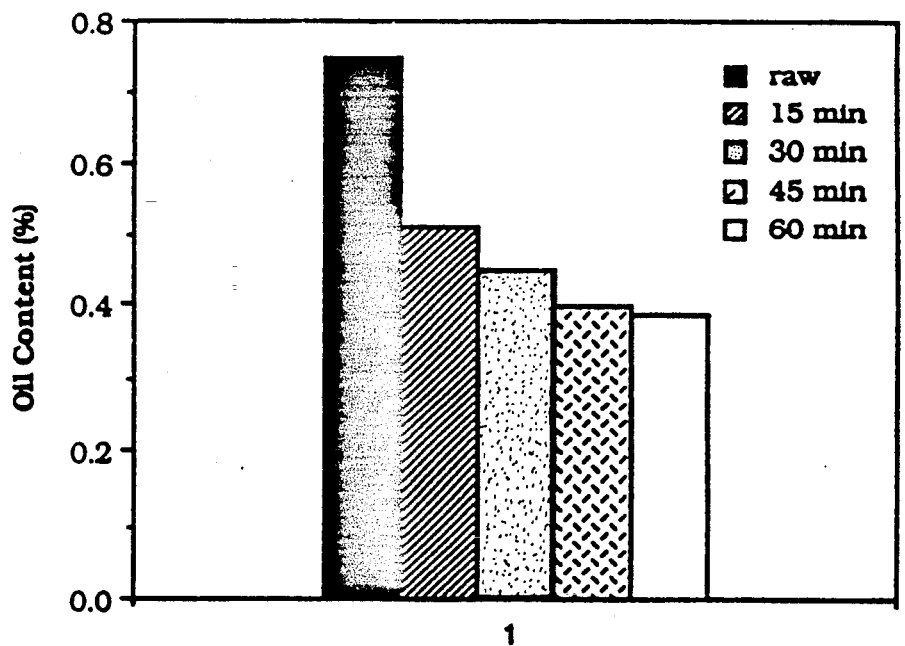
Figure 10B:
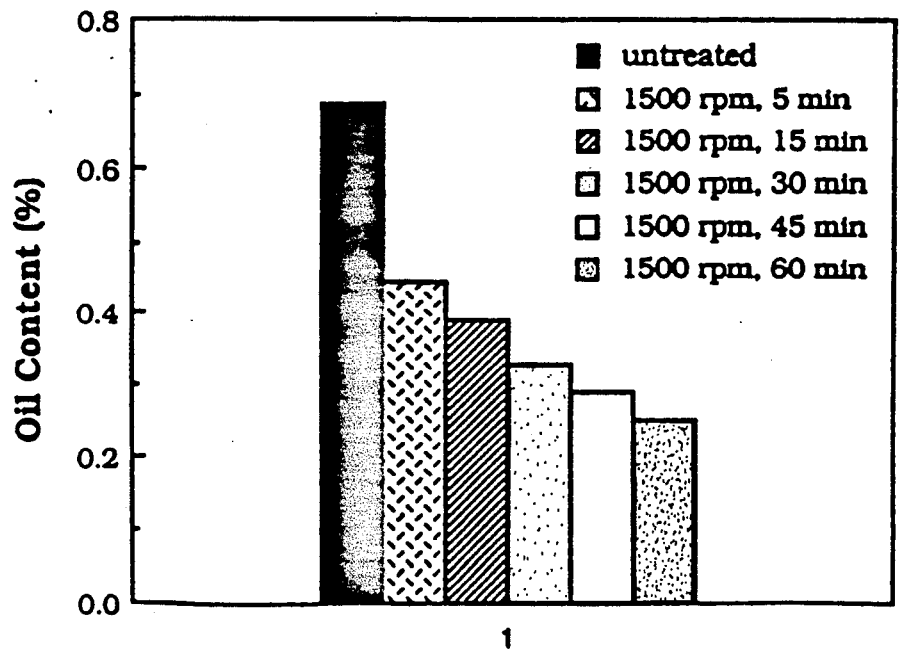
Figure 11:
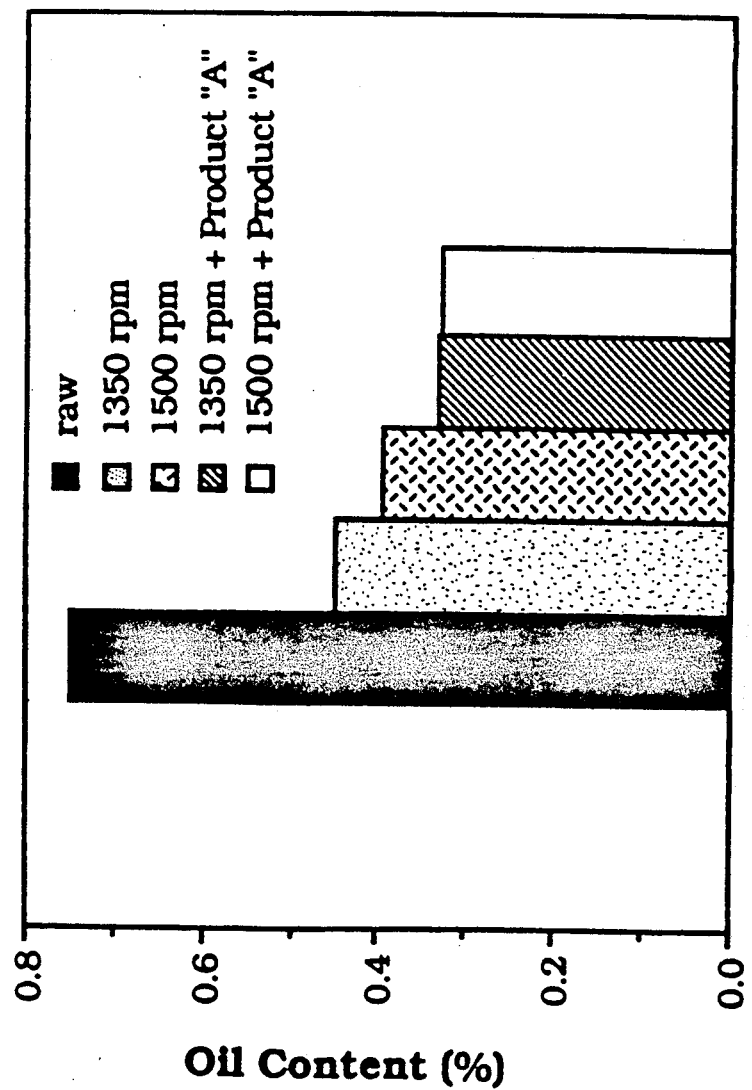
Figure 12:
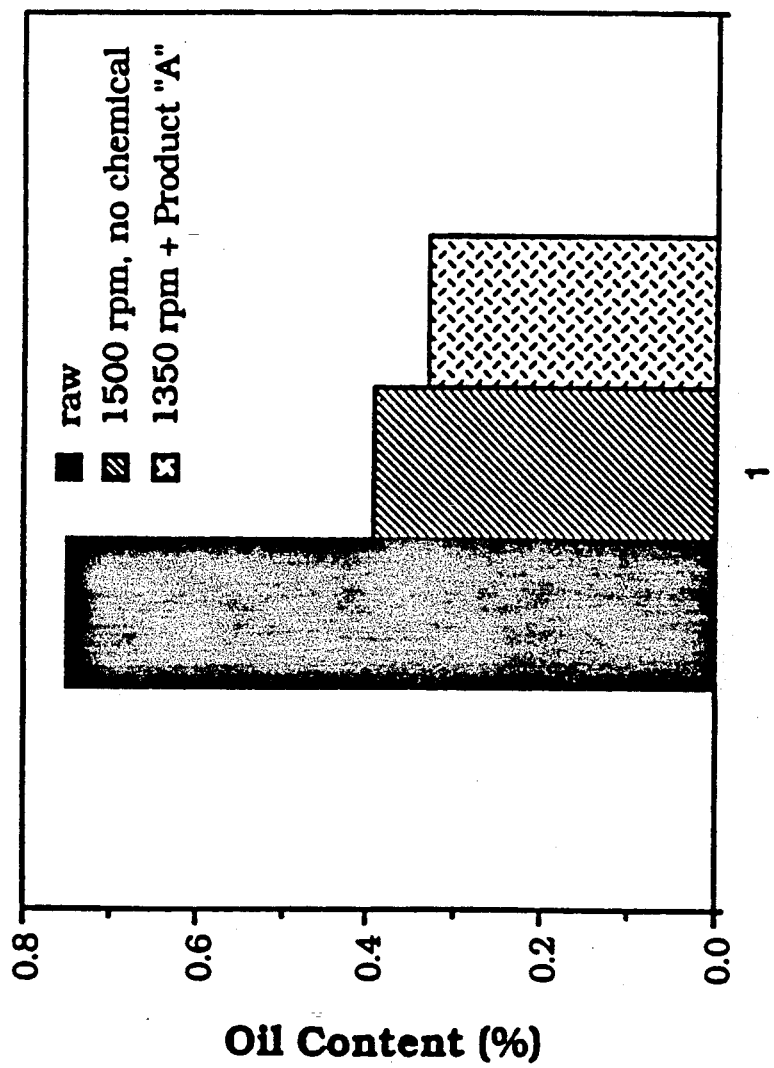
Figure 13:
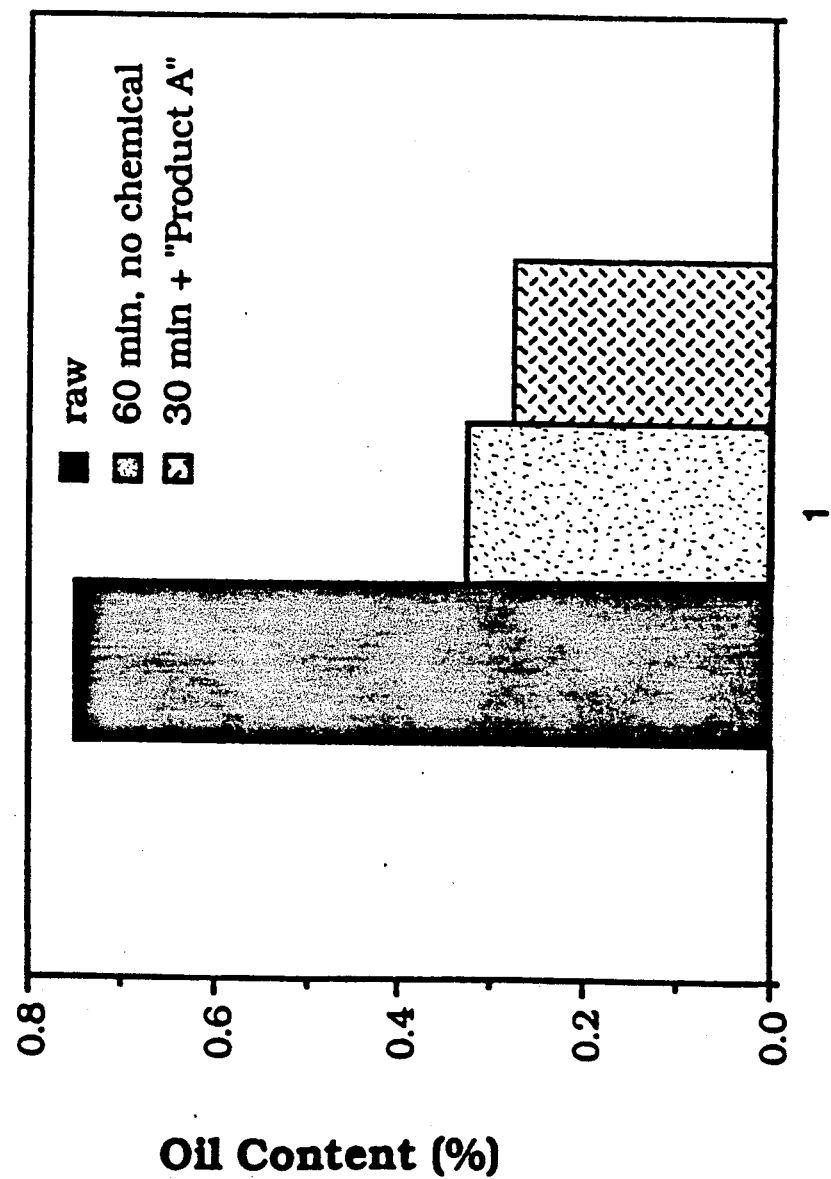

FIGS. 10 and 11 present further evidence that mixing energies, as they increase, can provide better removal of oil from mill scale. This is true in the presence of absence of chemical additives such as surfactants, particularly the nonionic surfactants used in FIG. 11. Also, increasing mixing time at a constant energy input results in increased oil removals.

Chemical addition of surfactants leads to greater oil removal under less severe mixing conditions than in the absence of chemical. Less severe mixing conditions can be expressed as shorter mixing time and at lower mixing energy. This is demonstrated in FIG. 12 and FIG. 13.

Figure 14:
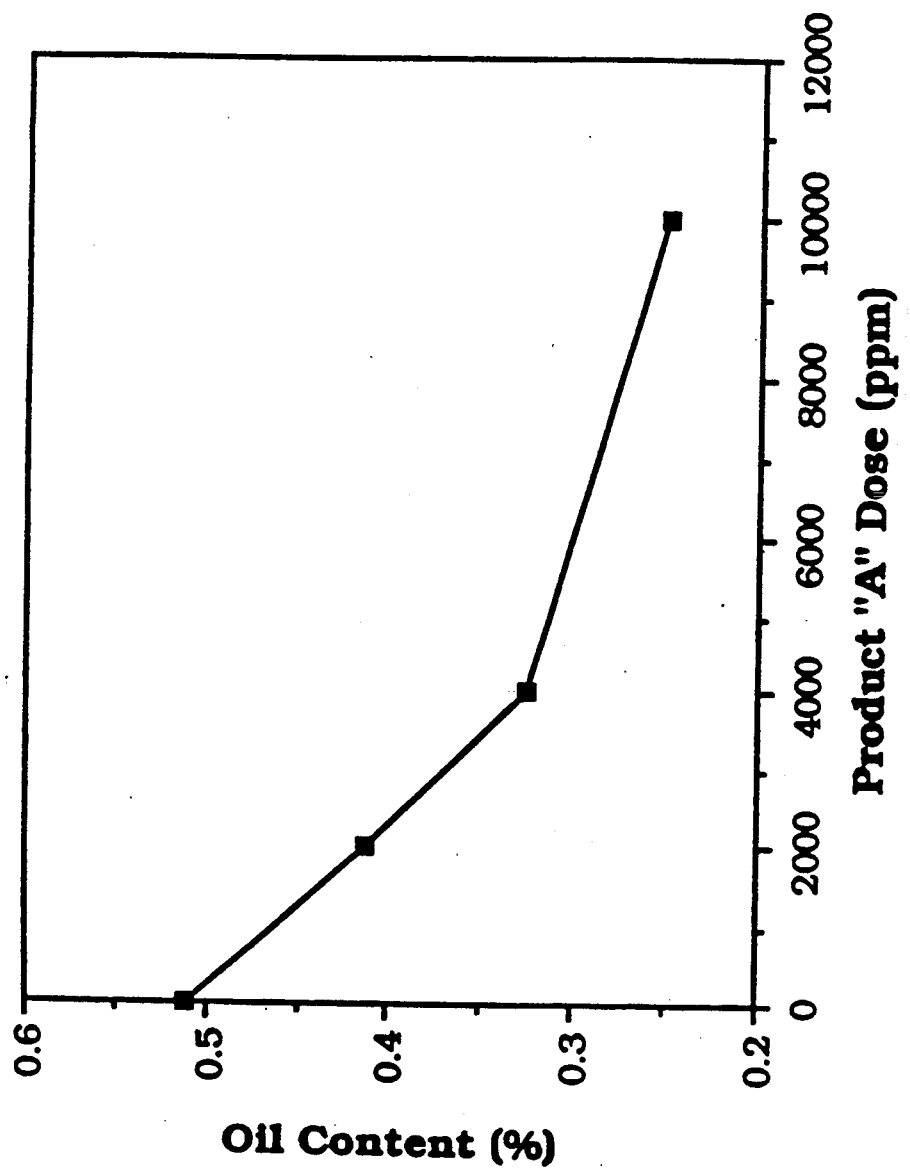

FIG. 14 describe the increase in efficiency achieved by chemical dosage of a nonionic surfactant. The time of operation and the chemical energy was constant throughout the tests described in FIG. 14.

Figure 15:
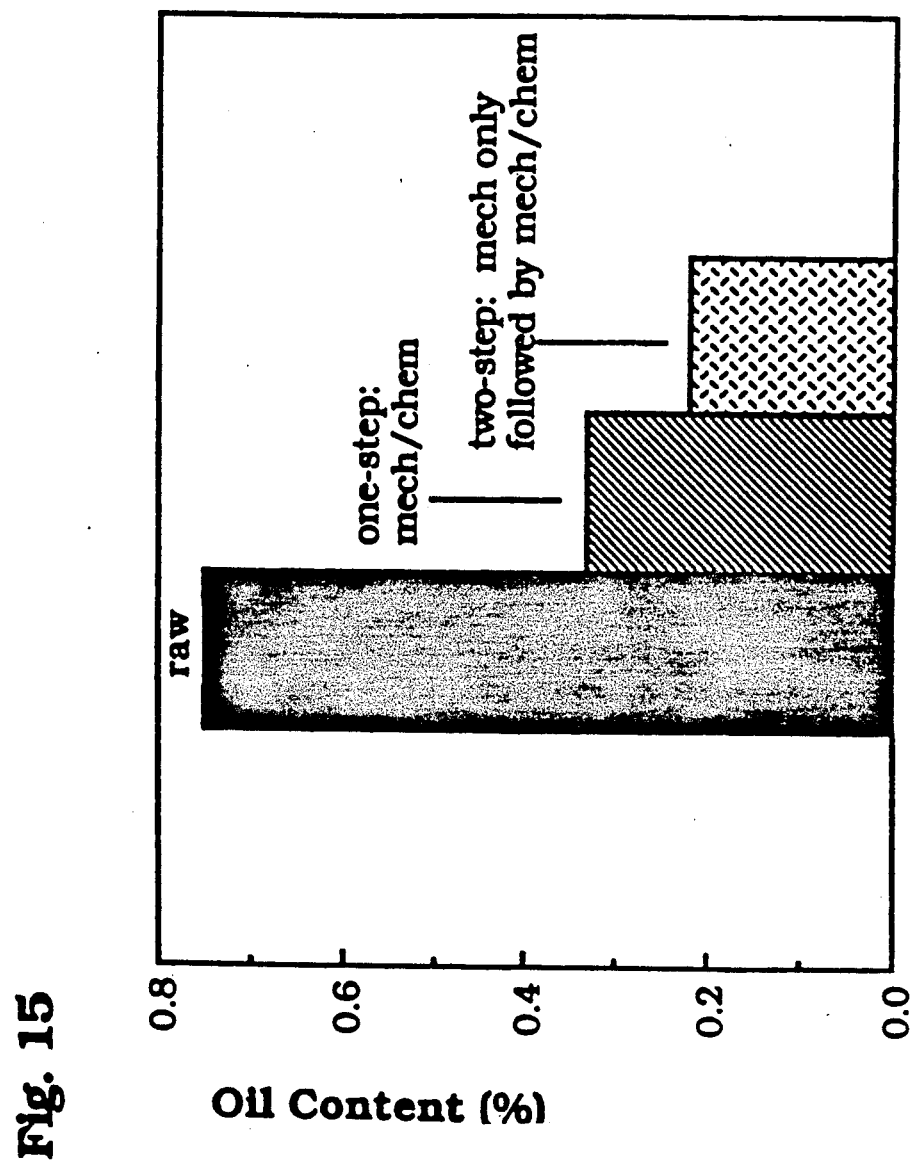

FIG. 15 is another example of the fact that a multiple unit operation including the high energy mixing achieves better results than a single one step exposure to the high energy mixing. In FIG. 15 both the mechanical high energy mixing and chemical treatment was used. Chemical treatment was with Product "A".

Figure 16:
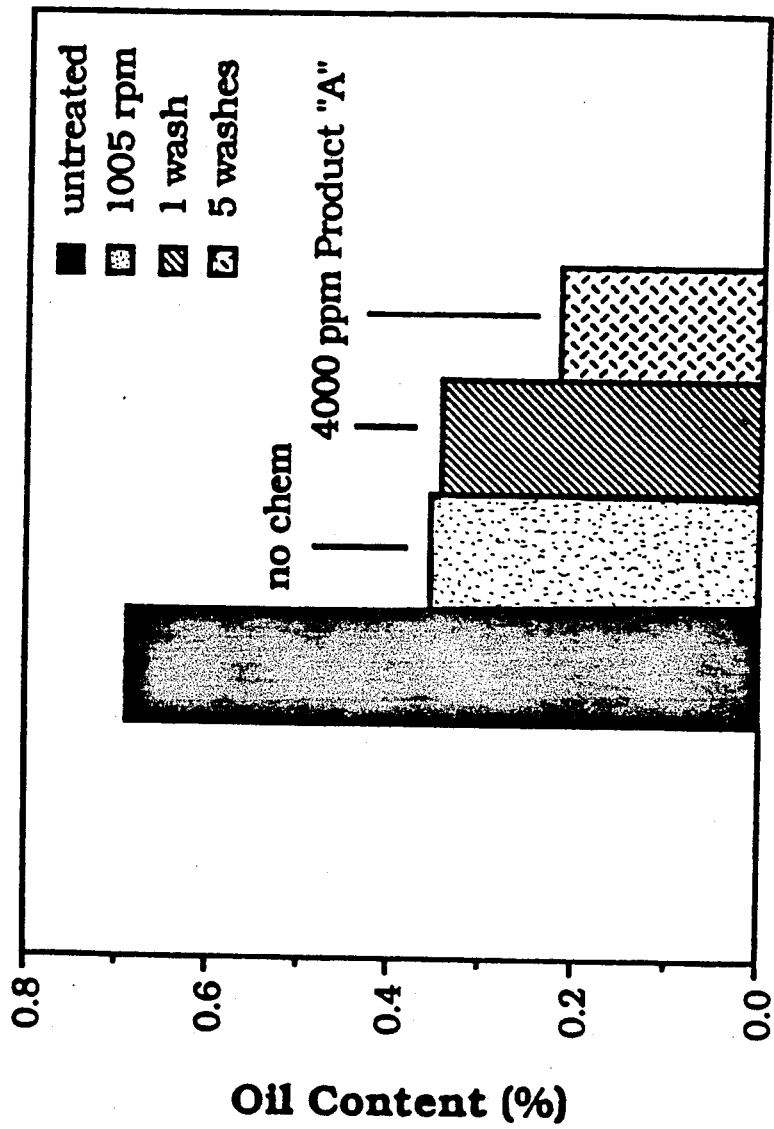

FIG. 16 presents the effect of water rinsing the treated slurries following high energy mixing and phase separation. The benefits of post treatment rinsing are shown in this figure which compares mill scale oil content derived from mechanically mixing without chemical use followed by rinsing for five times with fresh water and a mill scale that is chemically and mechanically treated with 4,000 parts per million of a nonionic surfactant in a mechanical high shear mixing device and then rinsed either once or five times with fresh water.

FIG. 17 shows the effect of rinsing mill scale with fresh water without any prior high energy mixing or without any treatment with surfactant. This demonstrates to an optional process in our invention which would include a pre-rinse, or pre-slurry of mill scale with fresh water followed by phase separation, preferably on a moving belt filter, and then re-slurrying a partially de-oiled mill scale with fresh water prior to treatment in the high energy mixing shearing chambers of the attritor.

Figure 18:
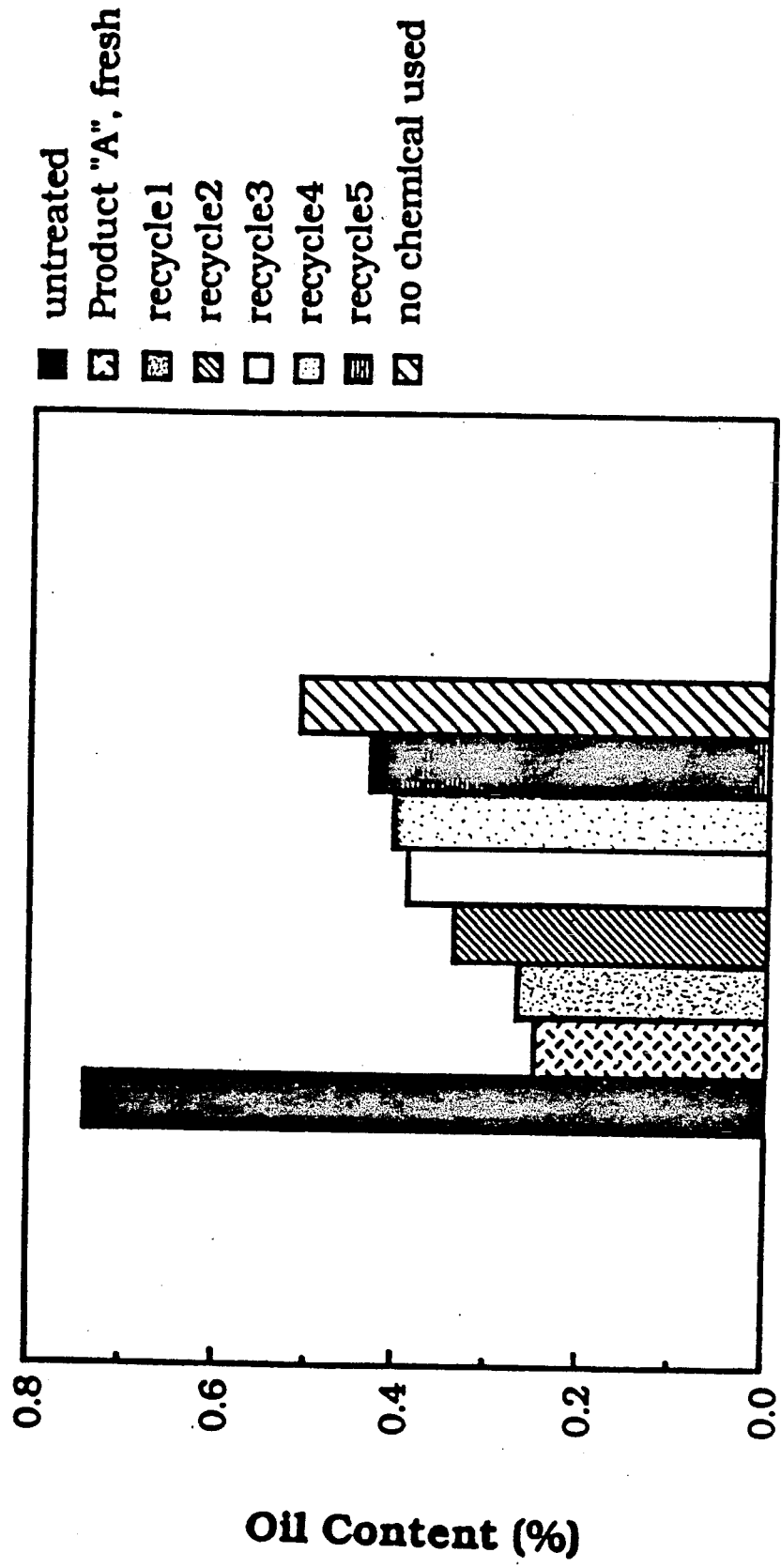

FIG. 18 shows results from the treatment or six separate mill scale samples, using wash water from one to reslurry the next, without wash water treatement in between. Product "A" was added to fresh water for the first treatment, and no additional chemical was added thereafter. Even after being used for 5 recycles, the chemically-laden wash water was able to remove more oil than was removed at identical mixing conditions in the absence of chemical. This shows that recycle of wash water is feasible. This is further supported by comparing tests 39, 40 and 43 in Table VI as shown in FIG. 19.

Figure 19:
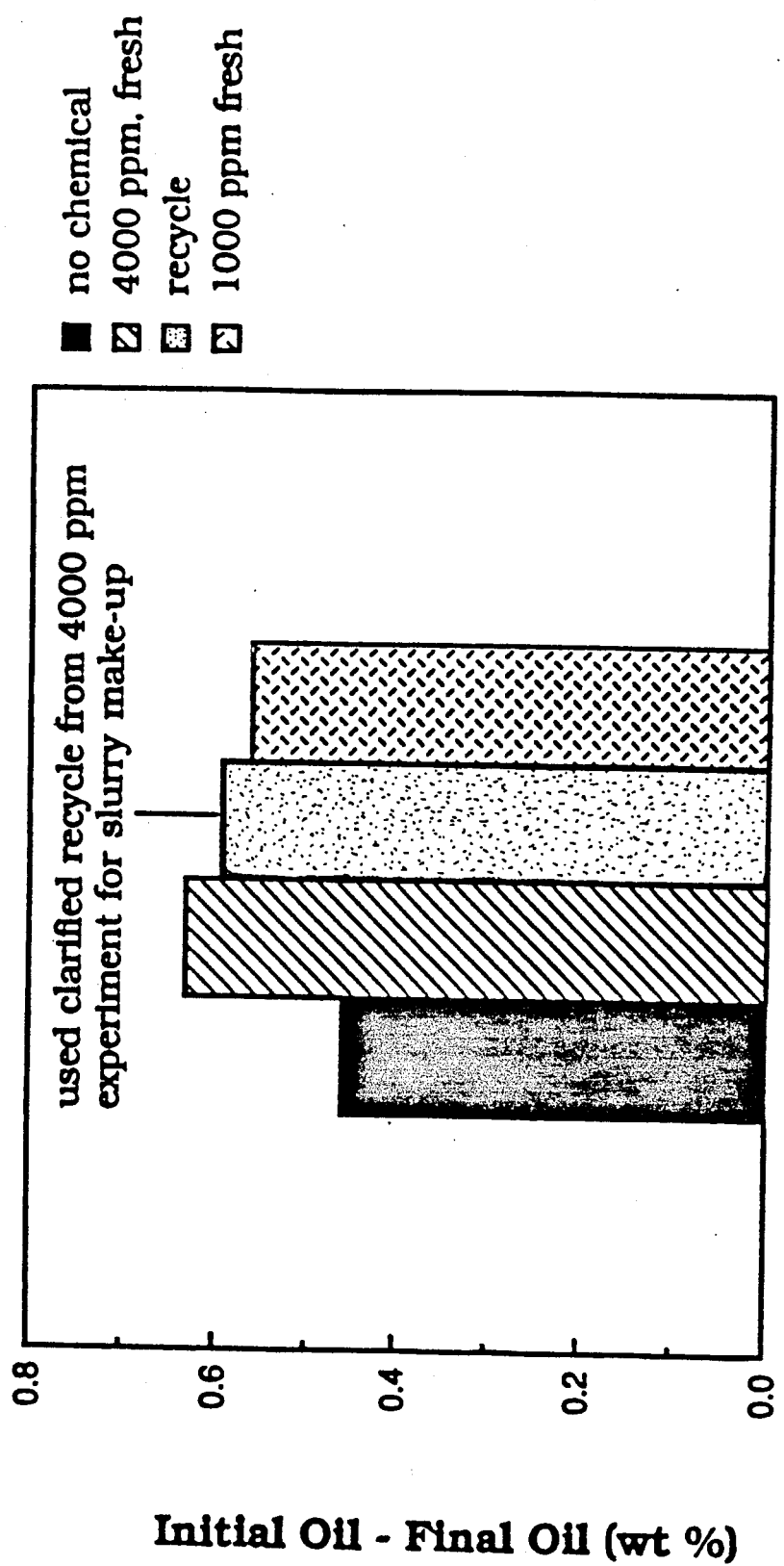

FIG. 19 demonstrates the feasibility of recycling wash waters obtained after clarification and treatment of waste oily emulsions obtained from our process.

Although some experience with multiple step use of surfactants has indicated the possibility of increasing the efficiency of oil removal from mill scale, these results may not be cost effective. However our invention includes the possibility of multiple use of surfactants, emulsifiers, or surface active agents in various operations of our process and multiple use of varying surfactants of varying types at different locations in the process, as long as the use does not contribute to retained oil on the treated de-oiled mill scale.

In addition to the products in Table XI, the following products have also been used as additives, emulsifiers or surfactants in an attempt to improve the operations of this invention.

TABLE XI

List of Surfactants Used
In the Mill Scale De-oiling Process to Date

| | |
|---|---|
| 1. Polyoxyethylated tallow amine | Cationic = Katapol PN-730 |
| 2. Methylpolyethylene (15) oleylammonium chloride | Cationic = Ethoquad 18/25 |
| 3. Polyoxylated quaternary ammonium chloride | Cationic = Ethoquad 0/25 |
| 4. Free acid of a complex organic phosphate ester (2 different ones) | Anionic = Gafac RE610<br>Anionic = Gafac RM510 |
| 5. Sodium 2-ethylhexyl sulfate | Anionic = Niaproof 08 |
| 6. Dioctyl ester of sodium sulfosuccinic acid | Anionic = Aerosol OT-75 |
| 7. Nonyl phenoxy polyoxyethylene ethanol (3 different ones) | Nonionic = IGEPAL CO-530<br>Nonionic = IGEPAL CO-520<br>Nonionic = IGEPAL CO-610 |

TABLE XI-continued
List of Surfactants Used
In the Mill Scale De-oiling Process to Date

| | | |
|---|---|---|
| 8. | Octyl phenoxy poly-ethylene ethanol | nonionic = Triton X-100 |
| 9. | Ethoxylated nonyl phenol (10 mole %) | Nonionic = R1310 |
| 10. | Butyl carbitol | Nonionic = R 9161 |
| 11. | Blend of #5, #6 | Anionic = HLB = 9.4 |
| 12. | Dialkyl phenoxylpoly-ethylene oxyethanol | Nonionic = IGEPAL DM430 |

Finally, the pH of the water and slurries used in the above process should range between a pH of about 2 to a pH of about 14, preferably the pH of the operation ranges from about a pH of 4 to about a pH of 12, and most preferably ranges between about a pH of 5 to about 10 pH. However, at very low or very high pH's, there is a tendency to dissolve in water more iron than might be desirable.

Having described our invention, we claim:

1. A process for de-oiling oily mill scale which consists essentially of
   (a) collecting oily mill scale and analyzing for oil content; and then
   (b) slurrying a portion of oily mill scale containing more than 0.5 weight percent in oil in water to achieve an aqueous mill scale slurry having at least 25 weight percent solids content; and then
   (c) high shear agitating the aqueous mill scale slurry to form a reduced oil mill scale suspension in an oily water emulsion; and then
   (d) phase separating the reduced oil mill scale from the oily water emulsion forming a reduced oil mill scale and oily water emulsion; and then
   (e) fresh water rinsing the reduced oil mill scale to form an oil-free mill scale and a waste wash water; and then
   (f) recycling the waste wash water to form at least a portion of the aqueous mill scale slurry of step b; and then
   (g) repeating steps (a) through (f) until the oil-free mill scale contains less than 0.5 weight percent oil; and then
   (h) drying the oil-free mill scale for use to form sinter plant feed in the steel making process.

2. The process of claim 1 which additionally consists essentially of adding to the aqueous mill scale slurry achieved in step (b) at least 100 ppm, based on total weight of the mill scale, of a water dispersible surface active agent capable of dispersing or dissolving in water at least a major portion of oily materials found on or in the oily mill scale and which surface active agent is essentially not retained on the oil-free mill scale after water washing.

3. The processes of claim 1 or claim 2 which further consists essentially of the steps, prior to the high shear agitating of the aqueous mill scale slurry, of phase separating the aqueous mill scale slurry into a partially de-oiled mill scale and an oily aqueous phase, and then at least partially reusing the oily aqueous phase to form the aqueous mill scale slurry, and then reslurrying the partially de-oiled mill scale in fresh water to form a mill scale slurry, and then treating said slurry by the high shear agitation of step (c) and subsequent steps of claim 1 or claim 2.

4. The process of claim 1 or claim 2 which additionally consists essentially of sizing the mill scale prior to slurrying in water to form an aqueous mill scale slurry, and forming the mill scale slurry of step (b) only with mill scale particles that contain at least 0.5 weight percent oil.

5. The process of claim 1 or claim 2 which additionally consists essentially of collecting the oily water emulsion and treating same to recover a fresh water phase and an oily sludge phase.

6. The process of claim 1, claim 2 or claim 3 which additionally consists essentially of a step (d) phase separating accomplished by adding the reduced oil mill scale suspension to a porous moving belt and collecting the oily water emulsion after passing through the porous belt and collecting the reduced oil mill scale on the porous moving belt.

7. The process of claim 1 or 2 or 3 which additionally consists essentially of collecting and recycling the waste wash water formed by rinsing in step (e) with fresh water the reduced oil mill scale so as to form by said recycling at least 25 volume % of the water used to form the aqueous mill scale slurry in step (b).

8. The process of claim 1 or 2 or 3 wherein the aqueous mill scale slurry of step (b) contains from about 40 weight percent solids to about 75 weight percent solids.

9. The process of claim 2 wherein the surface active agent is present in the aqueous mill scale slurry in at least 1000 ppm, based on total weight of the mill scale, and the surface active agent is chosen from the group consisting of at least one of Polyoxyethylated tallow amine, Methylpolyethylene (15) oleylammonium chloride, polyoxylated quaternary ammonium chloride, sodium 2-ethylhexyl sulfate, dioctyl ester of sodium sulfosuccinic acid, ethoxylated nonlphenolbutyl carbitol, octylphenoxy polyethylene ethanol, nonylphenoxy polyethylene ethanol or mixtures thereof.

10. The process of claim 1, claim 2, or claim 3 which additionally consists essentially of the high shear agitating in the step (c) in a multiple series operation of at least two units of one or more cells, each cell equipped with at least one agitator of sufficient design and operated at sufficient tip speed to provide an energy input from about 450 to about 3000 joules per pound of aqueous mill scale slurry.

11. A process for de-oiling steel mill generated oily mill scale to form a dried oil-free mill scale useful to make steel, which process consists essentially of:
   (a) collecting oily mill scale to obtain an oily mill scale having at least 0.5 weight percent oil; and then
   (b) slurrying a portion of oily mill scale containing at least 0.5 weight percent oil with water to form an aqueous mill scale slurry containing at least 25 weight percent mill scale solids; and then
   (c) agitating the aqueous mill scale slurry to dissolve or disperse easily removed oils in the water phase of the slurry; thereby forming a suspension of partially de-oiled mill scale in an oily water phase; and then
   (d) phase separating the partially de-oiled milled scale from the oily water phase by at least one of the phase separation techniques chosen from the group consisting of filtration, settling, centrifugation, and decantation; and then
   (e) collecting and reslurrying the partially de-oiled mill scale in fresh water to form a reduced oil mill scale in fresh water to form a reduced oil mill scale slurry, and collecting and recycling the oily water phase to be used to make up at least 10 volume percent of the water used to form the aqueous mill scale slurry of step (b), and then (f) high shear agitating the reduced oil mill scale slurry for sufficient time and at sufficient temperature to form an oil free mill scale suspension in an oily waste emulsion; and then (g) phase separating the oil-free mill scale from the oily waste emulsion to form a wet particulate oil-free mill scale and an oily waste emulsion; and then (h) fresh water rinsing the wet particulate oil-free mill scale to form a water rinsed oil-free mill scale and a waste wash water; and then collecting the water rinsed oil-free mill scale and recycling the wash water to make up a portion of the aqueous mill scale slurry; and then (i) repeating steps (e) through (h) using at least a portion of the water rinsed oil-free mill scale to make up the partially de-oiled mill scale slurry, until at least a major portion of the water washed oil-free mill scale contains less than 0.5 weight percent oil; and then (j) drying that portion of water rinsed oil-free mill scale containing less than 0.5 weight % oil to form a dried oil-free mill scale; and then (k) using as at least one source of iron the dried oil-free mill scale to make steel.

12. The process of claim 11 which additionally consists essentially of adding at least 100 ppm, based on the total weight of the mill scale, of a surface active agent to the process in at least one of the process steps: (b); (e); and (f).

13. The process of claim 11 or claim 12 wherein all operating temperatures range between 5° C. to about 95° C.

14. The process of claim 11, claim 12 or claim 13 wherein step (f) is multiply repeated in a series operation of at least 2 units of one or more cells, each cell equipped with at least one agitator of sufficient design and operated at sufficient tip speed to provide an energy input of from 450-3000 joules per pound of aqueous mill scale slurry.

15. The process of claim 11 which additionally comprises essentially of collecting and combining the oily waste emulsion separated from the solid oil-free mill scale in step (g) and those portions of oily waste water collected in step (e), which portions are not recycled and used to make up the aqueous mill scale slurry, and those portions of the waste wash water collected in step (h), which portions are not recycled and used to make up the aqueous mill scale slurry, thereby forming a combined oily waste water emulsion, and then treating said combined oily waste water emulsion with an effective demulsifying amount of an emulsion breaking chemical and reacting for sufficient times and temperatures to resolve the combined oily waste water emulsion into a water phase and an oily sludge phase, and then separating the water phase and oily sludge phase.

16. The process of claim 15 wherein the emulsion breaking chemical is chosen from at least one of the group consisting of $FeCl_3$, $Al(OH)_n(Cl)_{3-n}$, where n is from 0-3 and cationic polymers, and the temperatures ranges from about 5° C. to 95° C.

* * * * *

UNITED STATES PATENT AND TRADEMARK OFFICE
CERTIFICATE OF CORRECTION

PATENT NO. : 5,047,083

DATED : SEPTEMBER 10, 1991

INVENTOR(S) : NATALIE R. BLAKE & KRISTINE S. SIEFERT

It is certified that error appears in the above-identified patent and that said Letters Patent is hereby corrected as shown below:

CLAIM 15, COLUMN 30, LINE 11-12

The process of claim 11 which additionally comprises essentially of should read

The process of claim 11 which additionally consists essentially of

Signed and Sealed this

Nineteenth Day of January, 1993

Attest:

DOUGLAS B. COMER

*Attesting Officer*   *Acting Commissioner of Patents and Trademarks*